US011375556B2

(12) United States Patent
Gan et al.

(10) Patent No.: US 11,375,556 B2
(45) Date of Patent: *Jun. 28, 2022

(54) ASSOCIATION ESTABLISHMENT METHOD AND APPARATUS

(71) Applicant: Huawei Technologies Co., Ltd., Shenzhen (CN)

(72) Inventors: Ming Gan, Shenzhen (CN); Le Liu, Shenzhen (CN); Yunbo Li, Shenzhen (CN); Meilu Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,446

(22) Filed: Dec. 30, 2020

(65) Prior Publication Data

US 2021/0195664 A1     Jun. 24, 2021

Related U.S. Application Data

(63) Continuation of application No. 15/860,297, filed on Jan. 2, 2018, now Pat. No. 10,917,924, which is a
(Continued)

(30) Foreign Application Priority Data

Jul. 2, 2015    (WO) ................ PCT/CN2015/083228

(51) Int. Cl.
*H04W 76/11*    (2018.01)
*H04W 74/00*    (2009.01)
(Continued)

(52) U.S. Cl.
CPC .......... *H04W 76/11* (2018.02); *H04L 1/1614* (2013.01); *H04L 1/1621* (2013.01); *H04L 5/005* (2013.01);
(Continued)

(58) Field of Classification Search
CPC ... H04W 76/11; H04W 72/04; H04W 74/008; H04W 74/04; H04W 74/08;
(Continued)

(56) References Cited

U.S. PATENT DOCUMENTS

2007/0258466 A1*  11/2007  Kakani ................ H04L 1/1671
                                                                370/395.53
2008/0065884 A1    3/2008  Emeott et al.
(Continued)

FOREIGN PATENT DOCUMENTS

CN        102769854 A      11/2012
CN        103959681 A       7/2014
(Continued)

OTHER PUBLICATIONS

Reza Hedayat (Newracom), "Uplink ACK and BA Multiplexing," IEEE, May 10, 2015, doc.:IEEE802.11-15/0587r0, pp. 1-11.
(Continued)

*Primary Examiner* — Hassan Kizou
*Assistant Examiner* — Abdullahi Ahmed
(74) *Attorney, Agent, or Firm* — Leydig, Voit & Mayer, Ltd.

(57) ABSTRACT

An association establishment method and apparatus for carrying out the method are described. The association establishment method includes broadcasting, by an access point (AP), a trigger frame, wherein the trigger frame is used to trigger one or more unassociated stations STAs to perform uplink data transmission and indicate one or more available subchannels for random accessing of the unassociated STAs. The method further comprises receiving, by the AP, one or more association request messages sent on available subchannels acquired by the unassociated STAs. Thereafter, the AP broadcasts a multi-block acknowledgement M-BA frame, wherein the M-BA frame includes one or more pieces
(Continued)

of association acknowledgement information and the association acknowledgement information is acknowledgement information of the association request message.

28 Claims, 17 Drawing Sheets

Related U.S. Application Data continuation of application No. PCT/CN2015/084156, filed on Jul. 15, 2015.

(51) Int. Cl.
| | | |
|---|---|---|
| *H04W 74/04* | (2009.01) | |
| *H04L 1/16* | (2006.01) | |
| *H04W 72/04* | (2009.01) | |
| *H04W 74/08* | (2009.01) | |
| *H04L 5/00* | (2006.01) | |
| *H04W 84/12* | (2009.01) | |

(52) U.S. Cl.
CPC .......... *H04L 5/0037* (2013.01); *H04L 5/0055* (2013.01); *H04W 72/04* (2013.01); *H04W 74/008* (2013.01); *H04W 74/04* (2013.01); *H04W 74/08* (2013.01); *H04W 74/0833* (2013.01); *H04L 5/0007* (2013.01); *H04W 84/12* (2013.01)

(58) Field of Classification Search
CPC .......... H04W 74/0833; H04W 84/12; H04L 1/1614; H04L 1/1621; H04L 5/0037; H04L 5/005; H04L 5/0055; H04L 5/0007

See application file for complete search history.

(56) References Cited

U.S. PATENT DOCUMENTS

| | | | |
|---|---|---|---|
| 2014/0071959 A1 | 3/2014 | Ghosh et al. | |
| 2014/0314054 A1 | 10/2014 | Seok et al. | |
| 2014/0328238 A1 | 11/2014 | Seok et al. | |
| 2015/0365885 A1 | 12/2015 | Yang et al. | |
| 2016/0143006 A1* | 5/2016 | Ghosh | H04W 74/004 370/329 |
| 2016/0173662 A1* | 6/2016 | Seok | H04L 1/1896 370/252 |
| 2017/0202026 A1* | 7/2017 | Ahn | H04W 72/0413 |
| 2018/0041917 A1* | 2/2018 | Xi | H04L 27/2602 |
| 2018/0110076 A1* | 4/2018 | Ko | H04W 28/04 |
| 2018/0288743 A1* | 10/2018 | Choi | H04L 5/0055 |

FOREIGN PATENT DOCUMENTS

| | | |
|---|---|---|
| CN | 104023316 A | 9/2014 |
| JP | 2010050967 A | 3/2010 |
| RU | 2421922 C2 | 6/2011 |
| WO | 2013170136 A1 | 11/2013 |

OTHER PUBLICATIONS

Ghosh et al., "Random Access with Trigger Frames using OFDMA," IEEE 802.11-15/0604r0, XP068094472, Institute of Electrical and Electronics Engineers, New York, New York (May 12, 2015).
Kim et al., "Further consideration on Multi-STA Block ACK," IEEE 802.11-15/0626r1, XP068094505, Institute of Electrical and Electronics Engineers, New York, New York (May 11, 2015).
Merlin et al., "Multi-STA Acknowledgment," IEEE 802.11-15/0366r1, XP068083022, Institute of Electrical and Electronics Engineers, New York, New York (Mar. 9, 2015).
U.S. Appl. No. 15/860,297, filed Jan. 2, 2018, Patented.

* cited by examiner

| Bit | 4 | 12 |
|---|---|---|
| | Reserved bit | Starting sequence number |

FIG. 7

```
┌─────────────────────────────────────────────────────────┐
│ A first station STA receives a trigger frame broadcast   │
│ by an access point AP, where the trigger frame is used   │
│ to indicate at least one available subchannel and        │  S801
│ trigger multiple first stations STAs to perform uplink   │
│ data transmission at the same time                       │
└─────────────────────────────────────────────────────────┘
                           ↓
┌─────────────────────────────────────────────────────────┐
│ The first STA sends an association request message on a │
│ corresponding available channel, where the association  │  S802
│ request message includes a Media Access Control MAC     │
│ address of the first STA                                │
└─────────────────────────────────────────────────────────┘
                           ↓
┌─────────────────────────────────────────────────────────┐
│ The first STA receives a multi-block acknowledgement    │
│ M-BA frame broadcast by the AP, where the M-BA frame    │
│ includes at least one piece of association              │  S803
│ acknowledgement information, and the association        │
│ acknowledgement information is acknowledgement          │
│ information of the association request message          │
└─────────────────────────────────────────────────────────┘
                           ↓
┌─────────────────────────────────────────────────────────┐
│ If the trigger frame includes a temporary identifier    │
│ that is allocated by the AP to each available           │
│ subchannel, the M-BA frame includes a MAC address of at │
│ least one second STA; and if the first STA finds that   │
│ the MAC address of the first STA is in the M-BA frame,  │
│ the first STA determines that the association           │
│ acknowledgement information is acknowledgement          │
│ information sent by the AP to the first STA and uses a  │
│ temporary identifier of a corresponding available       │
│ subchannel as a first AID of the first STA; if the      │  S804
│ trigger frame includes no temporary identifier that is  │
│ allocated by the AP to each available subchannel, the   │
│ M-BA frame includes a MAC address of at least one       │
│ second STA and a first AID that is allocated by the AP  │
│ to the second STA; and if the first STA finds that the  │
│ MAC address of the first STA is in the M-BA frame, the  │
│ first STA obtains a first AID corresponding to the MAC  │
│ address of the first STA, where the second STA is a STA │
│ corresponding to the association request message        │
│ successfully received by the AP                         │
└─────────────────────────────────────────────────────────┘
                           ↓
┌─────────────────────────────────────────────────────────┐
│ The first STA receives an association response message  │
│ that is sent by the AP according to the first AID,      │
│ where the association response message is used to       │
│ indicate that an association between the first STA and  │  S805
│ the AP is successfully established, the association     │
│ response message includes a second AID, the second AID  │
│ is used to identify the first STA, and the second AID   │
│ is the same as or different from the first AID          │
└─────────────────────────────────────────────────────────┘
```

FIG. 8

ASSOCIATION ESTABLISHMENT METHOD AND APPARATUS

CROSS-REFERENCE TO RELATED APPLICATIONS

This application is a continuation of U.S. patent application Ser. No. 15/860,297, filed on Jan. 2, 2018, which is a continuation of International Application No. PCT/CN2015/084156, filed on Jul. 15, 2015, which claims priority to International Application No. PCT/CN2015/083228, filed on Jul. 2, 2015. All of the afore-mentioned patent applications are hereby incorporated by reference in their entireties.

TECHNICAL FIELD

Embodiments of the present invention relate to the field of wireless communications, and in particular, to an association establishment method and apparatus.

BACKGROUND

As an orthogonal frequency division multiple access (OFDMA) technology develops, a current wireless communications system can already support simultaneous data transmission by multiple stations (STA). When the multiple STAs send information to an access point (AP) by using the OFDMA technology, the information may be a control frame, a management frame, or a common data frame. The AP may broadcast acknowledgement messages to multiple stations in a form of a multi-block acknowledgement (M-BA) frame structure. FIG. 1 is a schematic structural diagram of an M-BA frame according to the prior art. As shown in FIG. 1, the M-BA frame includes one or more piece of block acknowledgement/acknowledgement information. In the prior art, each piece of block acknowledgement/acknowledgement information is sent to one STA for acknowledgement. Usually, if the AP sends an acknowledgement message for a single Media Access Control protocol data unit (MDPU) sent by only one STA, the block acknowledgement/acknowledgement information is acknowledgement information. If the AP sends an acknowledgement message for an aggregate-Media Access Control protocol data unit (A-MPDU) sent by only one STA, the block acknowledgement/acknowledgement information is block acknowledgement information. Each piece of block acknowledgement/acknowledgement information includes one association identifier (AID). Each AID is a unique identifier allocated by the AP to a STA. The identifier is used to identify the STA. This indicates that the acknowledgement information is sent by the AP to the STA identified by the AID. Herein, the AP allocates the AID to the STA when establishing an association with the STA.

In the prior art, a process in which an AP establishes an association with multiple STAs by means of OFDMA is as follows: First, the AP broadcasts a downlink trigger frame (downlink trigger). The downlink trigger frame indicates, by using a resource allocation indication bit, subchannels used by the multiple STAs to send association request messages. Second, the multiple STAs contend for an available subchannel by using a random backoff algorithm, and send the association request messages to the AP. If the AP sends an association acknowledgement message to the multiple STAs in a form of an M-BA, the following problem exists: Because the AP establishes no association with the multiple STAs, the AP does not know an AID of each STA.

Therefore, the AP cannot send an association acknowledgement message to the multiple STAs in the form of an M-BA. As a result, an association between the AP and a STA cannot be established, and communication reliability is reduced.

SUMMARY

Embodiments of the present invention provide an association establishment method and apparatus, so as to associate an AP with a STA, and further ensure communication reliability.

According to a first aspect, an embodiment of the present invention provides an association establishment method, including: broadcasting, by an access point AP, a trigger frame, where the trigger frame is used to indicate one or more available subchannel and trigger multiple first stations STAs to perform uplink data transmission at the same time;

receiving, by the AP, an association request message sent on a corresponding available subchannel by each of the multiple first STAs, where the association request message includes a Media Access Control (MAC) address of the first STA;

broadcasting, by the AP, a multi-block acknowledgement (M-BA) frame, where the M-BA frame includes one or more piece of association acknowledgement information, and the association acknowledgement information is acknowledgement information of the association request message, where if the trigger frame includes a temporary identifier that is allocated by the AP to each available subchannel, the association acknowledgement information includes a MAC address of one or more second STA, so that each second STA determines that the association acknowledgement information is acknowledgement information sent by the AP to the second STA and uses a temporary identifier of a corresponding available subchannel as a first AID of the second STA, where the second STA is a first STA corresponding to the association request message successfully received by the AP;

otherwise, the association acknowledgement information includes a MAC address of one or more second STA and a first AID that is allocated by the AP to the second STA; and sending, by the AP, an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

With reference to the first aspect, in a first possible implementation of the first aspect, if the trigger frame includes the temporary identifier that is allocated by the AP to each available subchannel, the association acknowledgement information further includes the temporary identifier of the available subchannel corresponding to the second STA.

With reference to the first possible implementation of the first aspect, in a second possible implementation of the first aspect, the temporary identifier included in the association acknowledgement information is further used to indicate that the association acknowledgement information is the acknowledgement information of the association request message.

With reference to the first aspect or the first possible implementation, in a third possible implementation of the first aspect, the association acknowledgement information further includes a dummy association identifier, and the dummy association identifier is used to indicate that the association acknowledgement information is the acknowledgement information of the association request message.

With reference to the first aspect or the first possible implementation, in a fourth possible implementation of the first aspect, a special traffic identifier TID in the association acknowledgement information is further used to indicate that the association acknowledgement information is the acknowledgement information of the association request message.

With reference to any one of the first aspect to the third possible implementation, in a fifth possible implementation of the first aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the first aspect to the fourth possible implementation, in a sixth possible implementation of the first aspect, the association acknowledgement information further includes a statistical identifier, and the statistical identifier indicates a quantity of second STAs to which the AP sends acknowledgement requests by using a same piece of association acknowledgement information.

With reference to the sixth possible implementation of the first aspect, in a seventh possible implementation of the first aspect, the statistical identifier is located after per traffic identifier information in the association acknowledgement information.

With reference to the sixth possible implementation of the first aspect, in an eighth possible implementation of the first aspect, the statistical identifier occupies a bit reserved in block acknowledgement starting sequence control in the association acknowledgement information.

According to a second aspect, an embodiment of the present invention provides an association establishment method, including:

receiving, by a first station STA, a trigger frame broadcast by an access point AP, where the trigger frame is used to indicate one or more available subchannel and trigger multiple first stations STAs to perform uplink data transmission at the same time;

sending, by the first STA, an association request message on a corresponding available subchannel, where the association request message includes a Media Access Control MAC address of the first STA;

receiving, by the first STA, a multi-block acknowledgement M-BA frame broadcast by the AP, where the M-BA frame includes one or more piece of association acknowledgement information, and the association acknowledgement information is acknowledgement information of the association request message, where if the trigger frame includes a temporary identifier that is allocated by the AP to each available subchannel, the M-BA frame includes a MAC address of one or more second STA; and if the first STA finds that the MAC address of the first STA is in the M-BA frame, the first STA determines that the association acknowledgement information is acknowledgement information sent by the AP to the first STA and uses a temporary identifier of the corresponding available subchannel as a first AID of the first STA;

otherwise, the M-BA frame includes a MAC address of one or more second STA and a first AID that is allocated by the AP to the second STA, and if the first STA finds that the MAC address of the first STA is in the M-BA frame, the first STA obtains a first AID corresponding to the MAC address of the first STA, where the second STA is a STA corresponding to the association request message successfully received by the AP; and receiving, by the first STA, an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

With reference to the second aspect, in a first possible implementation of the second aspect, if the trigger frame includes the temporary identifier that is allocated by the AP to each available subchannel, the association acknowledgement information further includes a temporary identifier of the available subchannel corresponding to the second STA.

With reference to the first possible implementation of the second aspect, in a second possible implementation of the second aspect, the temporary identifier included in the association acknowledgement information is further used to indicate that the association acknowledgement information is the acknowledgement information of the association request message.

With reference to the second aspect or the first possible implementation, in a third possible implementation of the second aspect, the association acknowledgement information further includes a dummy association identifier, and the dummy association identifier is used to indicate that the association acknowledgement information is the acknowledgement information of the association request message.

With reference to the second aspect or the first possible implementation, in a third possible implementation of the second aspect, a special traffic identifier TID in the association acknowledgement information is further used to indicate that the association acknowledgement information is the acknowledgement information of the association request message.

With reference to any one of the second aspect to the second possible implementation, in a fourth possible implementation of the second aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the second aspect to the third possible implementation, in a fifth possible implementation of the second aspect, the association acknowledgement information further includes a statistical identifier, and the statistical identifier indicates a quantity of second STAs to which the AP sends acknowledgement requests by using a same piece of association acknowledgement information.

With reference to the fifth possible implementation of the second aspect, in a sixth possible implementation of the second aspect, the statistical identifier is located after per traffic identifier information in the association acknowledgement information.

With reference to the fifth possible implementation of the second aspect, in a seventh possible implementation of the second aspect, the statistical identifier occupies a bit reserved in block acknowledgement starting sequence control in the association acknowledgement information.

According to a third aspect, an embodiment of the present invention provides an association establishment method, including:

receiving, by an access point AP, an association request message sent by each of one or more first station STA, where the association request message includes a token identifier generated by the first STA, and the token identifier is used to uniquely identify the first STA;

broadcasting, by the AP, a multi-block acknowledgement M-BA frame, where the M-BA frame includes one or more piece of association acknowledgement information, and the association acknowledgement information is acknowledgement information of the association request message, where the association acknowledgement information includes a token identifier of one or more second STA and a first association identifier AID that is allocated by the AP to the second STA, so that the second STA obtains the first AID according to the token identifier, where the second STA is a first STA corresponding to the association request message successfully received by the AP; and sending, by the AP, an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

With reference to the third aspect, in a first possible implementation of the third aspect, the association request message further includes a MAC address of the first STA.

With reference to the third aspect, in a second possible implementation of the third aspect, the association acknowledgement information further includes a MAC address of the second STA.

With reference to any one of the third aspect to the second possible implementation, in a third possible implementation of the third aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the third aspect to the second possible implementation, in a fourth possible implementation of the third aspect, the association acknowledgement information further includes a statistical identifier, and the statistical identifier indicates a quantity of second STAs to which the AP sends acknowledgement requests by using a same piece of association acknowledgement information.

With reference to the fourth possible implementation of the third aspect, in a fifth possible implementation of the third aspect, the statistical identifier is located after per traffic identifier information in the association acknowledgement information.

With reference to the fourth possible implementation of the third aspect, in a sixth possible implementation of the third aspect, the statistical identifier occupies a bit reserved in block acknowledgement starting sequence control in the association acknowledgement information.

According to a fourth aspect, an embodiment of the present invention provides an association establishment method, including:

generating, by a first station STA, a token identifier, where the token identifier is used to uniquely identify the first STA;

sending, by the first STA, an association request message to an access point AP, where the association request message includes the token identifier generated by the first STA;

receiving, by the first STA, a multi-block acknowledgement M-BA frame broadcast by the AP, where the M-BA frame includes one or more piece of association acknowledgement information, the association acknowledgement information is acknowledgement information of the association request message, the association acknowledgement information includes a token identifier of one or more second STA and a first association identifier AID that is allocated by the AP to the second STA, and the second STA is a STA corresponding to the association request message successfully received by the AP;

if the first STA finds that the token identifier of the first STA is in the M-BA frame, obtaining, by the first STA, a first AID in association acknowledgement information including the token identifier of the first STA; and receiving, by the first STA, an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

With reference to the fourth aspect, in a first possible implementation of the fourth aspect, the association request message further includes a Media Access Control MAC address of the first STA.

With reference to the first possible implementation of the fourth aspect, in a second possible implementation of the fourth aspect, the association acknowledgement information further includes a MAC address of the second STA.

With reference to any one of the fourth aspect to the second possible implementation, in a third possible implementation of the fourth aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the fourth aspect to the second possible implementation, in a fourth possible implementation of the fourth aspect, the association acknowledgement information further includes a statistical identifier, and the statistical identifier indicates a quantity of second STAs to which the AP sends acknowledgement requests by using a same piece of association acknowledgement information.

With reference to the fourth possible implementation of the fourth aspect, in a fifth possible implementation of the fourth aspect, the statistical identifier is located after per traffic identifier information in the association acknowledgement information.

With reference to the fourth possible implementation of the fourth aspect, in a sixth possible implementation of the fourth aspect, the statistical identifier occupies a bit reserved in block acknowledgement starting sequence control in the association acknowledgement information.

According to a fifth aspect, an embodiment of the present invention provides an association establishment apparatus, where the apparatus is an access point AP, and includes:

a broadcasting module, configured to broadcast a trigger frame, where the trigger frame is used to indicate one or more available subchannel and trigger multiple first stations STAs to perform uplink data transmission at the same time;

a receiving module, configured to receive an association request message sent on a corresponding available subchannel by each of the multiple first STAs, where the association request message includes a Media Access Control MAC address of the first STA, where the broadcasting module is further configured to broadcast a multi-block acknowledgement M-BA frame, where the M-BA frame includes one or more piece of association acknowledgement information, and the association acknowledgement information is acknowledgement information of the association request message, where if the trigger frame includes a temporary identifier that is allocated by the AP to each available subchannel, the association acknowledgement information includes a MAC address of one or more second STA, so that each second STA determines that the association acknowledgement information is acknowledgement information sent by the AP to the second STA and uses a temporary identifier of a corresponding available subchannel as a first AID of the second STA, where the second STA is a first STA corresponding to the association request message successfully received by the AP;

otherwise, the association acknowledgement information includes a MAC address of one or more second STA and a first AID that is allocated by the AP to the second STA; and a sending module, configured to send an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

With reference to the fifth aspect, in a first possible implementation of the fifth aspect, if the trigger frame includes the temporary identifier that is allocated by the AP to each available subchannel, the association acknowledgement information further includes the temporary identifier of the available subchannel corresponding to the second STA.

With reference to the first possible implementation of the fifth aspect, in a second possible implementation of the fifth aspect, the temporary identifier included in the association acknowledgement information is further used to indicate that the association acknowledgement information is the acknowledgement information of the association request message.

With reference to the fifth aspect or the first possible implementation, in a third possible implementation of the fifth aspect, the association acknowledgement information further includes a dummy association identifier, and the dummy association identifier is used to indicate that the association acknowledgement information is the acknowledgement information of the association request message.

With reference to the fifth aspect or the first possible implementation, in a fourth possible implementation of the fifth aspect, a special traffic identifier TID in the association acknowledgement information is further used to indicate that the association acknowledgement information is the acknowledgement information of the association request message.

With reference to any one of the fifth aspect to the third possible implementation, in a fifth possible implementation of the fifth aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the fifth aspect to the fourth possible implementation, in a sixth possible implementation of the fifth aspect, the association acknowledgement information further includes a statistical identifier, and the statistical identifier indicates a quantity of second STAs to which the AP sends acknowledgement requests by using a same piece of association acknowledgement information.

With reference to the sixth possible implementation of the fifth aspect, in a seventh possible implementation of the fifth aspect, the statistical identifier is located after per traffic identifier information in the association acknowledgement information.

With reference to the sixth possible implementation of the fifth aspect, in an eighth possible implementation of the fifth aspect, the statistical identifier occupies a bit reserved in block acknowledgement starting sequence control in the association acknowledgement information.

According to a sixth aspect, an embodiment of the present invention provides an association establishment apparatus, where the apparatus is a first station STA, and includes:

a receiving module, configured to receive a trigger frame broadcast by an access point AP, where the trigger frame is used to indicate one or more available subchannel and trigger multiple first stations STAs to perform uplink data transmission at the same time; and a sending module, configured to send an association request message on a corresponding available subchannel, where the association request message includes a Media Access Control MAC address of the first STA, where the receiving module is further configured to receive a multi-block acknowledgement M-BA frame broadcast by the AP, where the M-BA frame includes one or more piece of association acknowledgement information, and the association acknowledgement information is acknowledgement information of the association request message;

the apparatus further includes: a searching module, a determining module, and an obtaining module;

if the trigger frame includes a temporary identifier that is allocated by the AP to each available subchannel, the M-BA frame includes a MAC address of one or more second STA; and if the searching module finds that the MAC address of the first STA is in the M-BA frame, the determining module determines that the association acknowledgement information is acknowledgement information sent by the AP to the determining module and uses a temporary identifier of the corresponding available subchannel as a first AID of the determining module;

otherwise, the M-BA frame includes a MAC address of one or more second STA and a first AID that is allocated by the AP to the second STA, and if the searching module finds that the MAC address of the first STA is in the M-BA frame, the obtaining module obtains a first AID corresponding to the MAC address of the first STA, where the second STA is a STA corresponding to the association request message successfully received by the AP; and the receiving module is further configured to receive an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

With reference to the sixth aspect, in a first possible implementation of the sixth aspect, if the trigger frame includes the temporary identifier that is allocated by the AP to each available subchannel, the association acknowledgement information further includes a temporary identifier of the available subchannel corresponding to the second STA.

With reference to the first possible implementation of the sixth aspect, in a second possible implementation of the sixth aspect, the temporary identifier included in the association acknowledgement information is further used to indicate that the association acknowledgement information is the acknowledgement information of the association request message.

With reference to the sixth aspect or the first possible implementation, in a second possible implementation of the sixth aspect, the association acknowledgement information further includes a dummy association identifier, and the dummy association identifier is used to indicate that the association acknowledgement information is the acknowledgement information of the association request message.

With reference to the sixth aspect or the first possible implementation, in a third possible implementation of the sixth aspect, a special traffic identifier TID in the association acknowledgement information is further used to indicate that the association acknowledgement information is the acknowledgement information of the association request message.

With reference to any one of the sixth aspect to the second possible implementation, in a fourth possible implementation of the sixth aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the sixth aspect to the third possible implementation, in a fifth possible implementation of the sixth aspect, the association acknowledgement information further includes a statistical identifier, and the statistical identifier indicates a quantity of second STAs to which the AP sends acknowledgement requests by using a same piece of association acknowledgement information.

With reference to the fifth possible implementation of the sixth aspect, in a sixth possible implementation of the sixth aspect, the statistical identifier is located after per traffic identifier information in the association acknowledgement information.

With reference to the fifth possible implementation of the sixth aspect, in a seventh possible implementation of the sixth aspect, the statistical identifier occupies a bit reserved in block acknowledgement starting sequence control in the association acknowledgement information.

According to a seventh aspect, an embodiment of the present invention provides an association establishment apparatus, where the apparatus is an access point AP, and includes:

a receiving module, configured to receive an association request message sent by each of one or more first station STA, where the association request message includes a token identifier generated by the first STA, and the token identifier is used to uniquely identify the first STA;

a broadcasting module, configured to broadcast a multi-block acknowledgement M-BA frame, where the M-BA frame includes one or more piece of association acknowledgement information, and the association acknowledgement information is acknowledgement information of the association request message, where the association acknowledgement information includes a token identifier of one or more second STA and a first association identifier AID that is allocated by the AP to the second STA, so that the second STA obtains the first AID according to the token identifier, where the second STA is a first STA corresponding to the association request message successfully received by the AP; and a sending module, configured to send an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

With reference to the seventh aspect, in a first possible implementation of the seventh aspect, the association request message further includes a MAC address of the first STA.

With reference to the seventh aspect, in a second possible implementation of the seventh aspect, the association acknowledgement information further includes a MAC address of the second STA.

With reference to any one of the seventh aspect to the second possible implementation, in a third possible implementation of the seventh aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the seventh aspect to the second possible implementation, in a fourth possible implementation of the seventh aspect, the association acknowledgement information further includes a statistical identifier, and the statistical identifier indicates a quantity of second STAs to which the AP sends acknowledgement requests by using a same piece of association acknowledgement information.

With reference to the fourth possible implementation of the seventh aspect, in a fifth possible implementation of the seventh aspect, the statistical identifier is located after per traffic identifier information in the association acknowledgement information.

With reference to the fourth possible implementation of the seventh aspect, in a sixth possible implementation of the seventh aspect, the statistical identifier occupies a bit reserved in block acknowledgement starting sequence control in the association acknowledgement information.

According to an eighth aspect, an embodiment of the present invention provides an association establishment apparatus, where the apparatus is a first station STA, and includes:

a generation module, configured to generate a token identifier, where the token identifier is used to uniquely identify the first STA;

a sending module, configured to send an association request message to an access point AP, where the association request message includes the token identifier generated by the generation module;

a receiving module, configured to receive a multi-block acknowledgement M-BA frame broadcast by the AP, where the M-BA frame includes one or more piece of association acknowledgement information, the association acknowledgement information is acknowledgement information of the association request message, the association acknowledgement information includes a token identifier of one or more second STA and a first association identifier AID that is allocated by the AP to the second STA, and the second STA is a STA corresponding to the association request message successfully received by the AP; and a searching module, configured to: if the searching module finds that the token identifier of the searching module is in the M-BA frame, obtain a first AID in association acknowledgement information including the token identifier of the searching module, where the receiving module is further configured to receive an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

With reference to the eighth aspect, in a first possible implementation of the eighth aspect, the association request message further includes a Media Access Control MAC address of the first STA.

With reference to the first possible implementation of the eighth aspect, in a second possible implementation of the eighth aspect, the association acknowledgement information further includes a MAC address of the second STA.

With reference to any one of the eighth aspect to the second possible implementation, in a third possible implementation of the eighth aspect, a special traffic identifier TID or all 4 bits of a TID in the association acknowledgement information indicates or indicate a quantity of second STAs to which the AP sends acknowledgement requests by using a same piece of association acknowledgement information.

With reference to any one of the eighth aspect to the second possible implementation, in a fourth possible implementation of the eighth aspect, the association acknowledgement information further includes a statistical identifier, and the statistical identifier indicates a quantity of second STAs to which the AP sends acknowledgement requests by using a same piece of association acknowledgement information.

With reference to the fourth possible implementation of the eighth aspect, in a fifth possible implementation of the eighth aspect, the statistical identifier is located after per traffic identifier information in the association acknowledgement information.

With reference to the fourth possible implementation of the eighth aspect, in a sixth possible implementation of the eighth aspect, the statistical identifier occupies a bit reserved in block acknowledgement starting sequence control in the association acknowledgement information.

The embodiments of the present invention provide the association establishment method and apparatus. The method includes: broadcasting, by the access point AP, the trigger frame; receiving, by the AP, the association request message sent on the corresponding available subchannel by each of the multiple first stations STAs; broadcasting, by the AP, the multi-block acknowledgement M-BA frame, where the M-BA frame includes one or more piece of association acknowledgement information, and the association acknowledgement information is acknowledgement information of the association request message, where if the trigger frame includes the temporary identifier that is allocated by the AP to each available subchannel, the association acknowledgement information includes the MAC address of one or more second STA, so that each second STA uses the temporary identifier of the corresponding available subchannel as the first association identifier AID of the second STA; otherwise, the association acknowledgement information includes the MAC address of one or more second STA and the first AID that is allocated by the AP to the second STA; and sending, by the AP, the association response message to the second STA, where the association response message is used to indicate that the association between the second STA and the AP is successfully established. Because the AP adds a MAC address of a second STA to a piece of association acknowledgement information in the M-BA frame, provided that the second STA reads the MAC address of the second STA, it indicates that the association acknowledgement information is an acknowledgement of an association request sent by the second STA. In this way, the AP is associated with the STA, and communication reliability is ensured.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 7 is a schematic diagram of a block acknowledgement starting sequence control field according to an embodiment of the present invention;

FIG. 8 is a flowchart of an association establishment method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
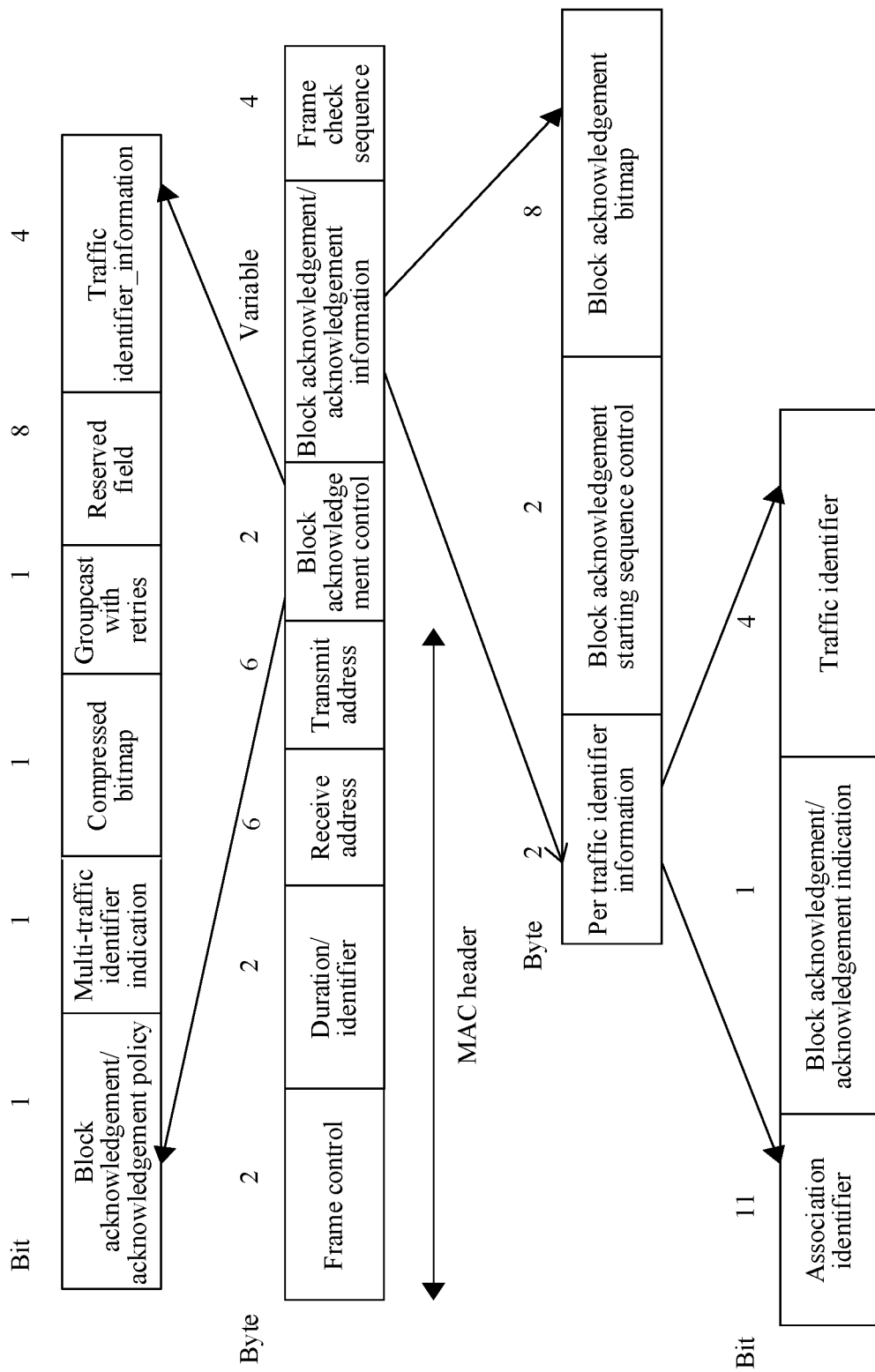
FIG. 1 is a schematic structural diagram of an M-BA frame according to the prior art.

The embodiments of the present invention are based on a wireless local area network (WLAN) technology. An application scenario of the embodiments of the present invention is as follows: Before communicating with a STA, an AP needs to establish an association with the STA, and an important step of establishing an association is that the STA needs to obtain an AID allocated by the AP to the STA, where the AID is used to uniquely identify the STA. Usually, the AP receives association request messages sent by multiple STAs. The multiple STAs may send the association request messages based on an OFDMA technology. The AP may send an association acknowledgement message to the multiple STAs in two manners. A first manner is an OFDMA acknowledgement. That is, the AP sends an acknowledgement ACK or a block acknowledgement BA to the multiple stations on orthogonal subchannels. The ACK is an acknowledgement of a single Media Access Control Protocol data unit (MPDU). The BA is an acknowledgement of an aggregate-Media Access Control Protocol data unit (A-MPDU). A second manner is an M-BA frame acknowledgement, which is a broadcast message. That is, the AP sends, to the STAs by means of broadcasting by using an M-BA frame, acknowledgements to be sent to the multiple STAs. As shown in FIG. 1, the M-BA frame includes: a control frame, a duration/an identifier (duration/ID), a receive address (RA), a transmit address (TA), block acknowledgement control (BA control), block acknowledgement/acknowledgement information (BA/ACK Info), and a frame check sequence (FCS). The block acknowledgement control includes a block acknowledgement/acknowledgement (BA/ACK) policy, a multi-traffic identifier (Multi-TID), a compressed bitmap, groupcast with retries (GCR), a reserved field, and traffic identifier_information (TID Info). The TID info is used to indicate how much BA/ACK Info exists. Further, the BA/ACK Info includes per traffic identifier information (Per TID Info). When the BA/ACK Info is BA Info, the BA/ACK Info further includes block acknowledgement starting sequence control and a block acknowledgement bitmap. Still further, an AID of a STA is set in the first 11 bits of the Per TID Info, and is used to indicate a station to which the AP is to send an acknowledgement. The $12^{th}$ bit is a block acknowledgement/acknowledgement indication (BA/ACK Indication). The 13th to the 16th bits are a traffic identifier TID. The following describes in detail a method for establishing an association between an AP and a STA.

Figure 2:
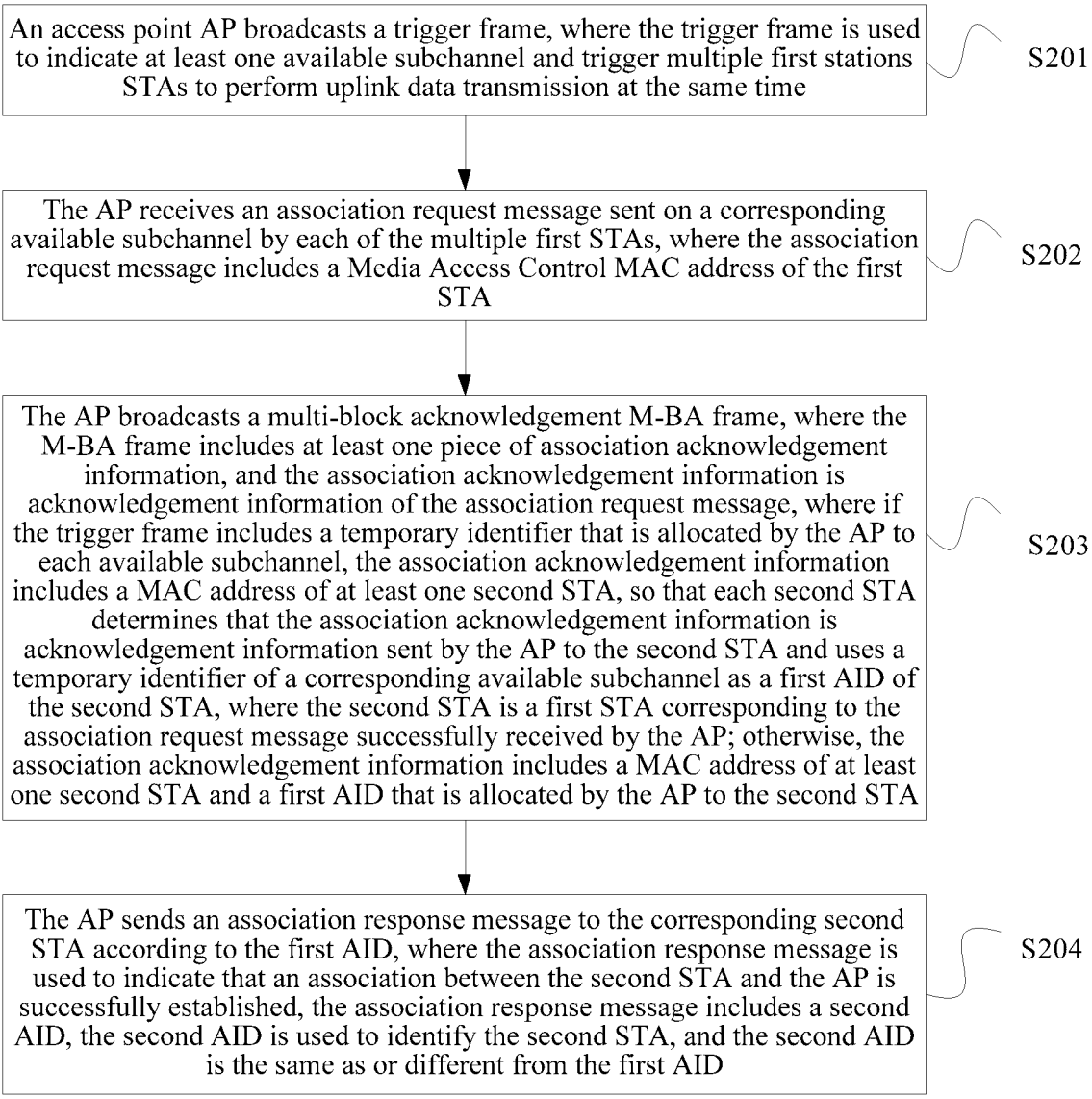
FIG. 2 is a flowchart of an association establishment method according to an embodiment of the present invention.

FIG. 2 is a flowchart of an association establishment method according to an embodiment of the present invention. The method is performed by an AP. As shown in FIG. 2, the method specifically includes the following procedure.

S201. The access point AP broadcasts a trigger frame, where the trigger frame is used to indicate one or more available subchannel and trigger multiple first stations STAs to perform uplink data transmission at the same time.

Specifically, the first STA herein is a STA with which the AP does not establish any association. Usually, the trigger frame broadcast by the AP may indicate, by using a resource allocation indication bit, which STAs transmit data on which available subchannels, or may indicate, by using a resource allocation indication bit, which available subchannels are used by the multiple first STAs by means of random access, so that the multiple first STAs contend for an available subchannel by using a random backoff algorithm. Because no association is established between the AP and the first STA, the trigger frame herein can only be the latter one. That is, the trigger frame indicates, by using a resource allocation indication bit, that one or more available subchannel is used by the multiple STAs by means of random access. Herein, the multiple first STAs may transmit uplink data at the same time in an OFDMA manner.

S202. The AP receives an association request message sent on a corresponding available subchannel by each of the multiple first STAs, where the association request message includes a Media Access Control (MAC) address of the first STA.

Specifically, when the AP sends the trigger frame, and a resource indication bit in the trigger frame indicates which subchannels may be contended for by the multiple first STAs, a first STA that receives the trigger frame sends an association request message by using an available subchannel. For example, a STA 1 and a STA 2 send association request messages on a subchannel 8. Certainly, the association request message carries a MAC address of the first STA.

S203. The AP broadcasts a multi-block acknowledgement M-BA frame, where the M-BA frame includes one or more piece of association acknowledgement information, and the association acknowledgement information is acknowledgement information of the association request message, where if the trigger frame includes a temporary identifier that is allocated by the AP to each available subchannel, the association acknowledgement information includes a MAC address of one or more second STA, so that each second STA determines that the association acknowledgement information is acknowledgement information sent by the AP to the second STA and uses a temporary identifier of a corresponding available subchannel as a first AID of the second STA, where the second STA is a first STA corresponding to the association request message successfully received by the AP; otherwise, the association acknowledgement information includes a MAC address of one or more second STA and a first AID that is allocated by the AP to the second STA.

Specifically, the association acknowledgement information herein corresponds to block acknowledgement/acknowledgement information in FIG. 1. However, different from the block acknowledgement information in the prior art, block acknowledgement information in this embodiment of the present invention is a piece of association acknowledgement information that may be sent to multiple first STAs for acknowledgement at the same time, or may be sent to one first STA for acknowledgement. Further, when the AP receives association request messages that are sent on a same subchannel, the AP usually successfully receives a signal with a greatest signal-to-noise ratio. For example, the STA 1 and the STA 2 each send an association request message on a subchannel 8, but a signal-to-noise ratio of the message sent by the STA 1 is greater than that of the message sent by the STA 2. In this case, the AP usually can receive only the message from the STA 1. According to different content included in the trigger frame, there may be the following two cases.

Case 1: If the trigger frame includes the temporary identifier that is allocated by the AP to each available contention subchannel, the first STA that receives the trigger frame learns the temporary identifier of the available contention subchannel. In this case, after obtaining the subchannel by means of contention, the first STA obtains the temporary identifier of the subchannel, and uses, by default, the temporary identifier as a first AID of the first STA. In this case, the association acknowledgement information may include only the MAC address of the one or more second STA. After a first STA receives the M-BA frame, if the first STA reads a MAC address of the first STA from a piece of association acknowledgement information BA/ACK Info, it indicates that the association acknowledgement information BA/ACK Info is an acknowledgement of an association request message sent by the first STA. In this case, the first STA is a second STA. The second STA uses, as a first association identifier AID of the second STA, a temporary identifier of a subchannel previously used for sending an association request message. The second STA in this embodiment is the first STA corresponding to the association request message successfully received by the AP.

Optionally, the M-BA frame further includes the temporary identifier of the available subchannel corresponding to the second STA. That is, although the AP already broadcasts, in the trigger frame, the temporary identifier of each available subchannel, for guarantee, the AP adds, to the M-BA frame again, the temporary identifier of the available subchannel corresponding to the second STA.

Case 2: If the trigger frame does not include the temporary identifier allocated by the AP to each available subchannel, the association acknowledgement information includes the MAC address of the one or more second STA and the first AID that is allocated by the AP to the second STA. In this case, when a first STA learns, by means of reading, that a piece of association acknowledgement information in the M-BA frame includes a MAC address of the first STA, it indicates that the association acknowledgement information is an acknowledgement of an association request message sent by the first STA. The first STA obtains a first AID included in the association acknowledgement information that includes the MAC address of the first STA.

Notably, the first AID in this embodiment of the present invention is equivalent to a temporary identifier allocated by the AP to the second STA.

S204. The AP sends an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

Specifically, in step S203, the M-BA frame broadcast by the AP is only a frame that includes association acknowledgement information. However, in addition to sending the AID to the second STA, the AP further needs to send other information to the second STA, such as an enhanced distributed channel access (EDCA) parameter, or a 20/40 basic service set (BSS) BSS. Certainly, after sending the M-BA frame, the current AP may cancel some associated STAs. After the cancelation is performed, the AID of the STA may be canceled. For ease of management, for example, the AP hopes that AIDs allocated to the STAs may be consecutive. Based on such a case, the AP may adjust the first AID previously allocated to the second STA, that is, reallocate a second AID to the second STA. Therefore, the foregoing first AID is referred to as the temporary identifier allocated by the AP to the second STA. Certainly, the second AID herein may be the same as the first AID.

This embodiment of the present invention provides the association establishment method, including: broadcasting, by the access point AP, the trigger frame; receiving, by the AP, the association request message sent on the corresponding available subchannel by each of the multiple first stations STAs; broadcasting, by the AP, the multi-block acknowledgement M-BA frame, where the M-BA frame includes one or more piece of association acknowledgement information, and the association acknowledgement information is acknowledgement information of the association request message, where if the trigger frame includes the temporary identifier that is allocated by the AP to each available contention subchannel, the association acknowledgement information includes the MAC address of one or more second STA, so that each second STA uses the temporary identifier of the corresponding available subchannel as the first association identifier AID of the second STA; otherwise, the association acknowledgement information includes the MAC address of one or more second STA and a first AID that is allocated by the AP to the second STA; and sending, by the AP, the association response message to the second STA in the downlink OFDMA manner, and indicating, by using a resource indication bit of downlink OFDMA, that the STA corresponding to the first AID receives an association response on a subchannel. The subchannel herein is any current available subchannel. Usually, the AP selects a better subchannel, to send an association response message to the STA. The association response message is used to indicate that an association between the second STA and the AP is successfully established. Because the AP adds a MAC address of a second STA to a piece of association acknowledgement information in the M-BA frame, provided that the second STA reads the MAC address of the second STA, it indicates that the association acknowledgement information is an acknowledgement of an association request sent by the second STA. In this way, the AP is associated with the STA, and communication reliability is ensured.

Usually, one M-BA frame may include one or more piece of association acknowledgement information, or may include common acknowledgement information. The common acknowledgement information is not acknowledgement information of the association request message. The following describes in detail how to differentiate whether acknowledgement information in an M-BA frame is association acknowledgement information or common acknowledgement information.

Figure 3A:
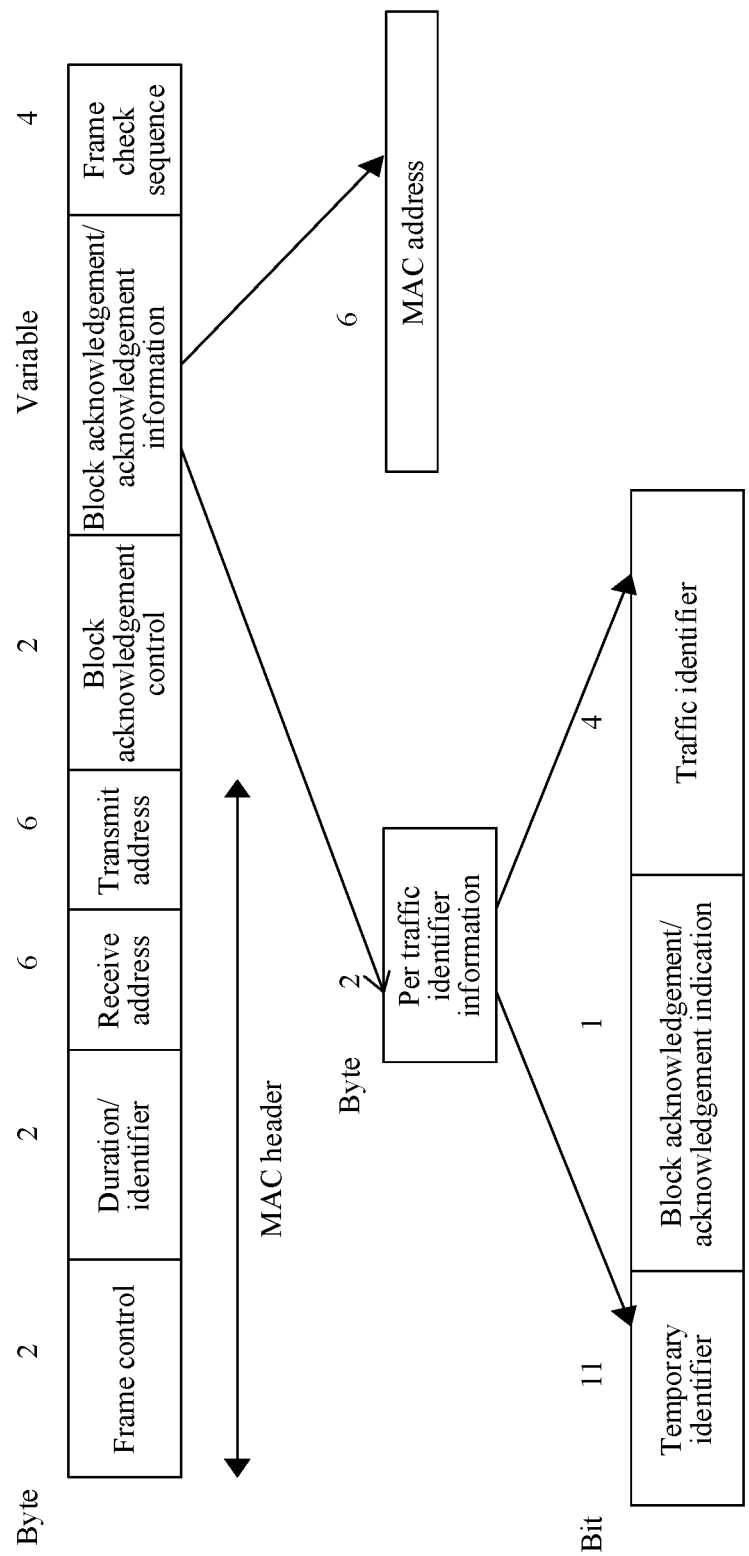
FIG. 3A is a first schematic structural diagram of an M-BA frame according to an embodiment of the present invention.
Figure 3B:
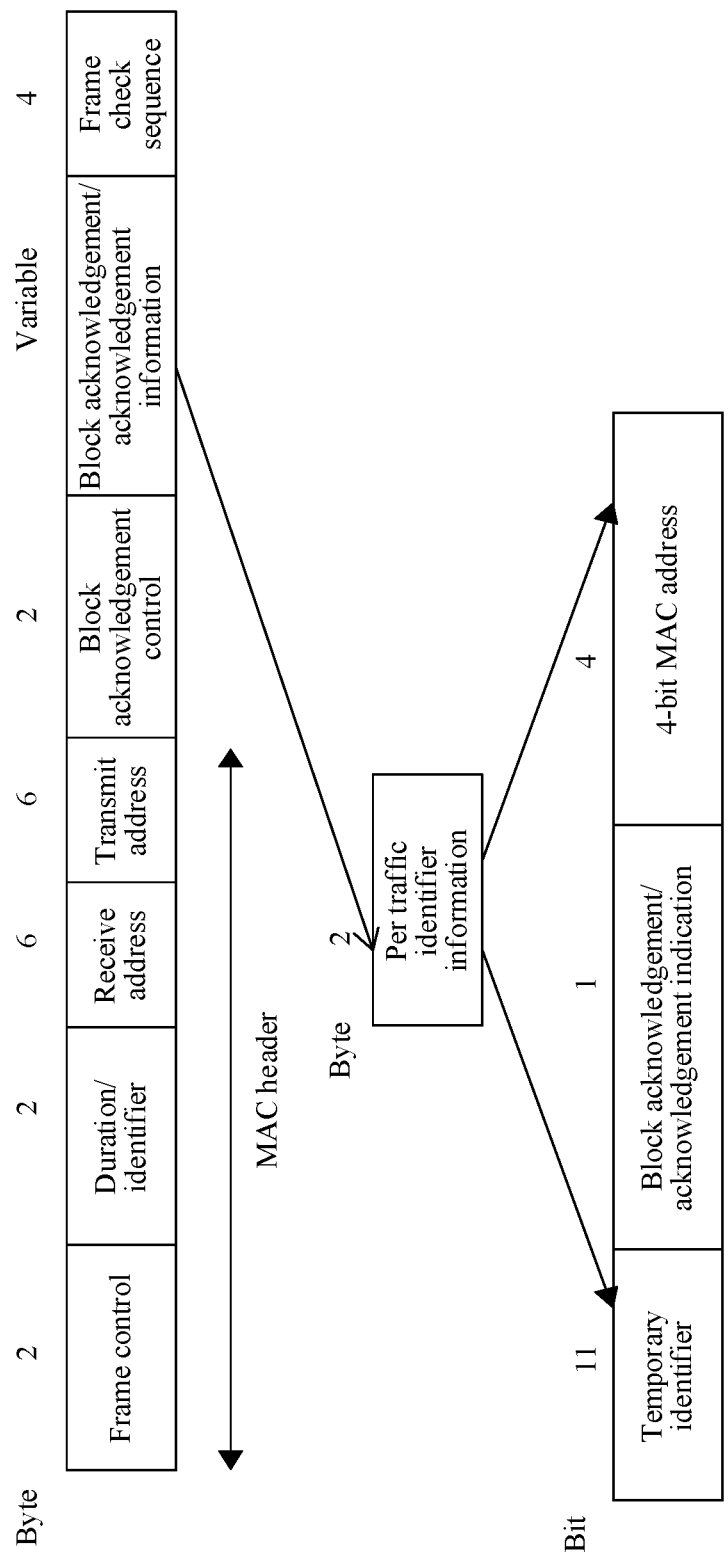
FIG. 3B is a second schematic structural diagram of an M-BA frame according to an embodiment of the present invention.

In an optional manner, if the trigger frame includes the temporary identifier allocated by the AP to each available subchannel, the association acknowledgement information further includes the temporary identifier of the available subchannel corresponding to the second STA. The temporary identifier is further used to indicate that the association acknowledgement information is the acknowledgement information of the association request message. Block acknowledgement/acknowledgement information in all the following accompanying drawings is the association acknowledgement information in this embodiment of the present invention. FIG. 3A is a first schematic structural diagram of an M-BA frame according to an embodiment of the present invention. As shown in FIG. 3A, per traffic identifier information in block acknowledgement/acknowledgement information includes a temporary identifier. Specifically, block acknowledgement/acknowledgement information BA/ACK Info in an M-BA frame broadcast by the AP usually may not be association acknowledgement information, and may be common acknowledgement information. Therefore, when receiving a trigger frame, a first STA learns a temporary identifier of an available subchannel, and uses the temporary identifier as a first AID of the first STA. Therefore, when receiving an M-BA frame, provided that the first STA identifies that the temporary identifier exists in a piece of block acknowledgement/acknowledgement information, the first STA can determine that the block acknowledgement/acknowledgement information is association acknowledgement information. Further, as shown in FIG. 3A, the block acknowledgement/acknowledgement information further includes a MAC address. Therefore, the first STA may further determine, by using the MAC address, whether the block acknowledgement/acknowledgement information is sent to the first STA. FIG. 3B is a second schematic structural diagram of an M-BA frame according to an embodiment of the present invention. Per traffic identifier information in FIG. 3B includes a 4-bit MAC address. When receiving a trigger frame, a first STA learns a temporary identifier of an available subchannel, and uses the temporary identifier as a first AID of the first STA. Therefore, when receiving an M-BA frame, provided that the first STA identifies that the temporary identifier exists in a piece of block acknowledgement/acknowledgement information, the first STA can determine that the block acknowledgement/acknowledgement information is association acknowledgement information. Further, the first STA can determine, according to the temporary identifier, that the block acknowledgement/acknowledgement information is sent by the AP to the first STA. Still further, the first STA can determine, by comparing the 4-bit MAC address with a MAC address of the first STA, that the block acknowledgement/acknowledgement information is sent by the AP to the first STA.

Figure 4:
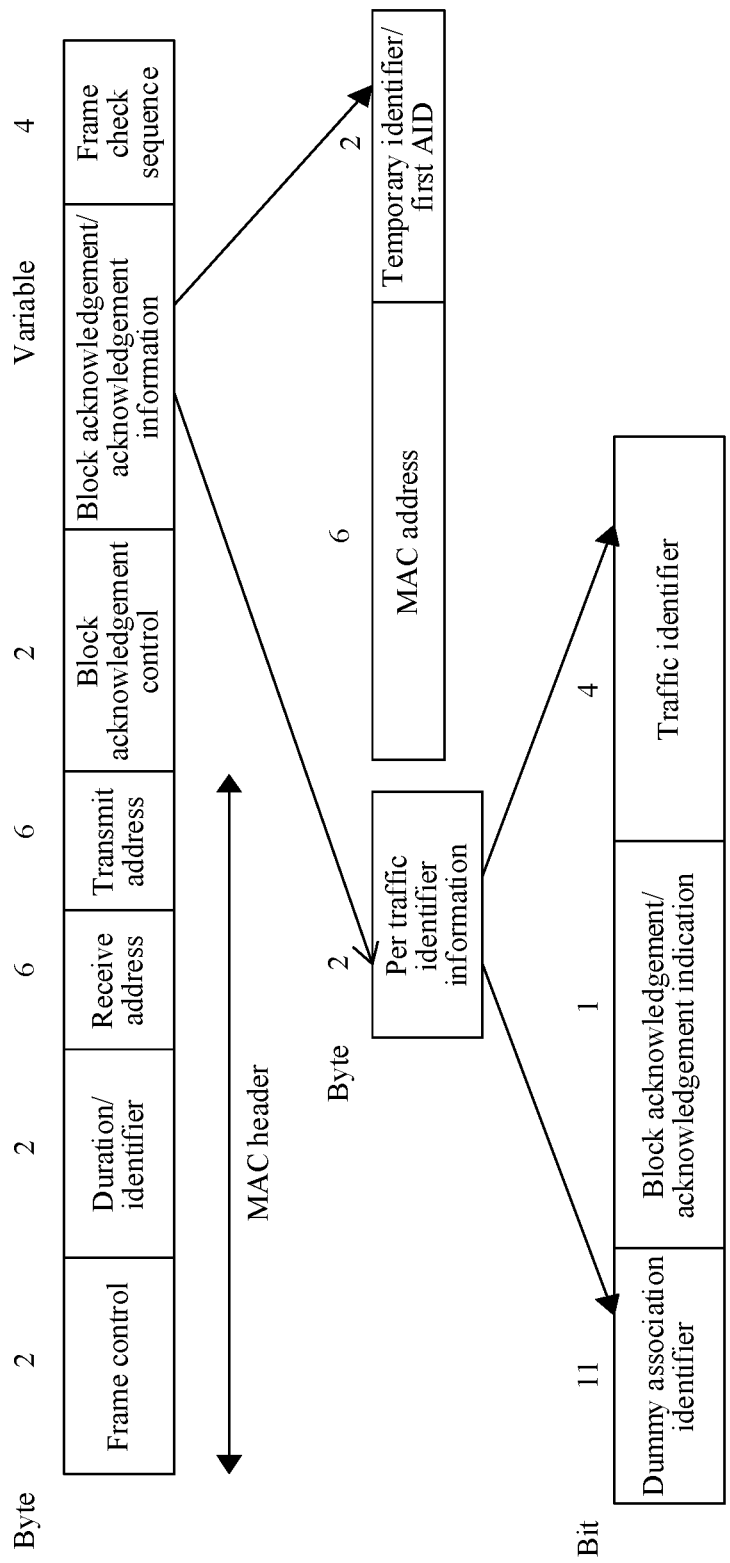
FIG. 4 is a third schematic structural diagram of an M-BA frame according to an embodiment of the present invention.

In another optional manner, the association acknowledgement information in the M-BA frame further includes a dummy association identifier. and the dummy association identifier is used to indicate that the association acknowledgement information is the acknowledgement information of the association request message. The dummy association identifier may be indicated by using 11 bits of 0, or may be a special identifier specified by the AP. Specifically, FIG. 4 is a third schematic structural diagram of an M-BA frame according to an embodiment of the present invention. As shown in FIG. 4, the dummy association identifier is located in the per traffic identifier information and occupies 11 bits, and may be indicated by using a special AID. For example, the dummy association identifier may be indicated by using 11 bits of 0. When the first STA receives a trigger frame M-BA frame, when the first STA determines that the dummy association identifier exists in a piece of block acknowledgement/acknowledgement information, the first STA determines that the block acknowledgement/acknowledgement information is association acknowledgement information. Further, as shown in FIG. 4, a MAC address in the M-BA frame is located after the per traffic identifier information and occupies 6 bytes. In the two cases for the M-BA frame, the temporary identifier or the first AID may be located after the MAC address and occupy 2 bytes.

The method for acknowledging an association request by means of the M-BA frame may be further extended to an acknowledgement other than an acknowledgement of a common data frame, for example, an acknowledgement of a sounding beamforming matrix feedback frame, or an acknowledgement of an authentication request. In this case, the first 11 bits of a dummy association identifier in each traffic identifier field are used to indicate that the acknowledgement information is acknowledgement information of an acknowledgement other than an acknowledgement of a common data frame. The last 5 bits in each traffic identifier field may be redefined, and may be used to indicate a type of a frame to be acknowledged by using the acknowledgement information and a length that immediately follows each traffic identifier field. The length herein may be in unit of 1 byte, or may be in a unit of 2 bytes. For example, 2 of the 5 bits are used to indicate four types of acknowledgement information, and 3 of the 5 bits are used to indicate the length that immediately follows each traffic identifier field. For the acknowledgement of the sounding beamforming matrix feedback frame, a segment acknowledgement bitmap (segment ACK bitmap) of 2 bytes immediately follows each traffic identifier field.

Figure 5:
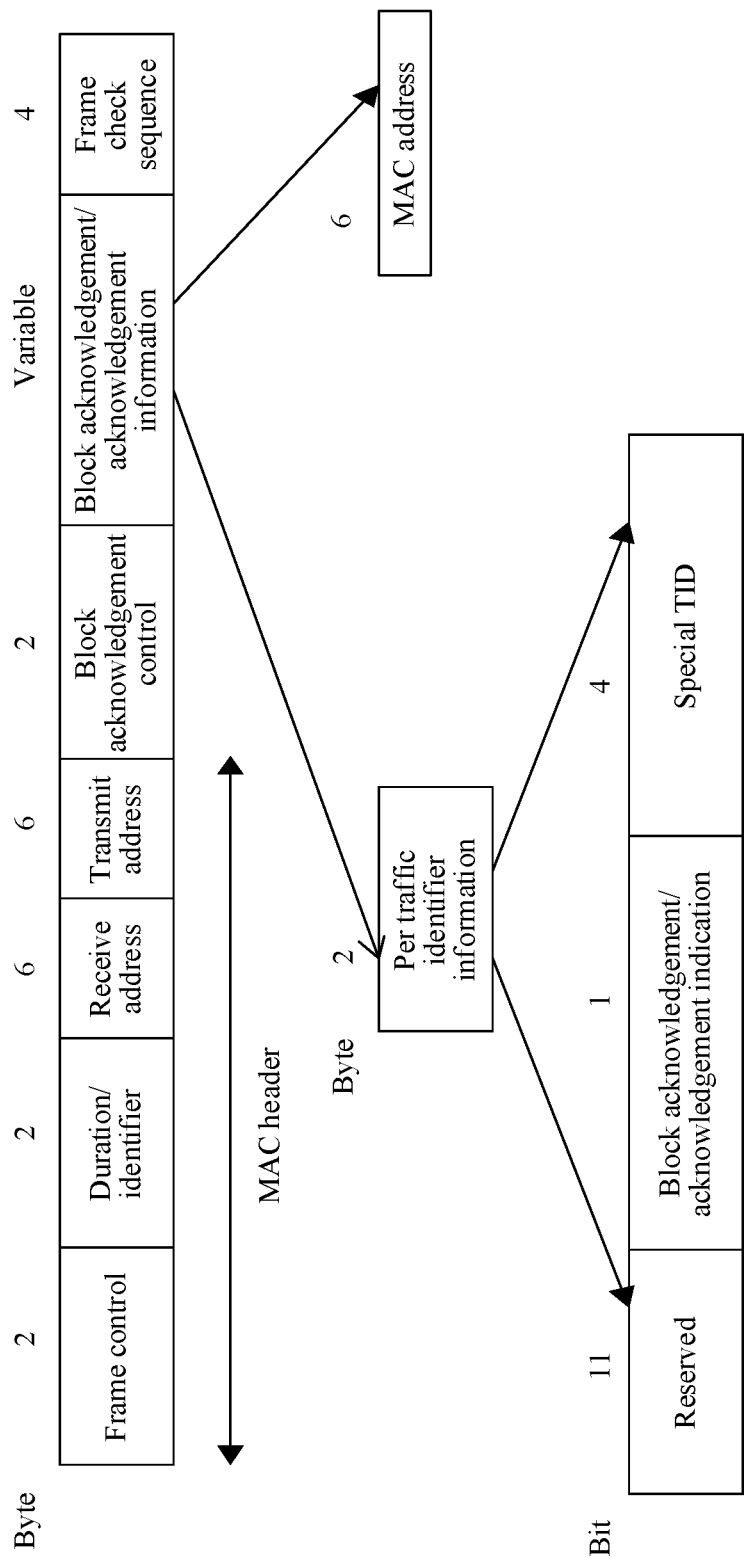
FIG. 5 is a fourth schematic structural diagram of an M-BA frame according to an embodiment of the present invention.

In still another optional manner, a special traffic identifier TID in the association acknowledgement information is further used to indicate that the association acknowledgement information is the acknowledgement information of the association request message. FIG. 5 is a fourth schematic structural diagram of an M-BA frame according to an embodiment of the present invention. As shown in FIG. 5, a TID is usually filled in the 13th to the 16th bits in per traffic identifier information. However, based on an enhanced distributed channel access (EDCA) technology, there are usually eight types of TIDs in an M-BA frame. These eight types of TIDs need to occupy only 3 bits. However, 4 bits are allocated to the TID in the per traffic identifier information. Therefore, a TID whose values are 0 to 7 may indicate a normal TID, and a TID whose values are 8 to 15 is a special TID. Therefore, a special TID may be used to indicate that block acknowledgement/acknowledgement information is acknowledgement information of the association request message. Further, a MAC address in the M-BA frame is located after the per traffic identifier information and occupies 6 bytes. When the trigger frame includes the temporary identifier allocated by the AP to each available subchannel, there may be no temporary identifier after the MAC address.

Figure 23:
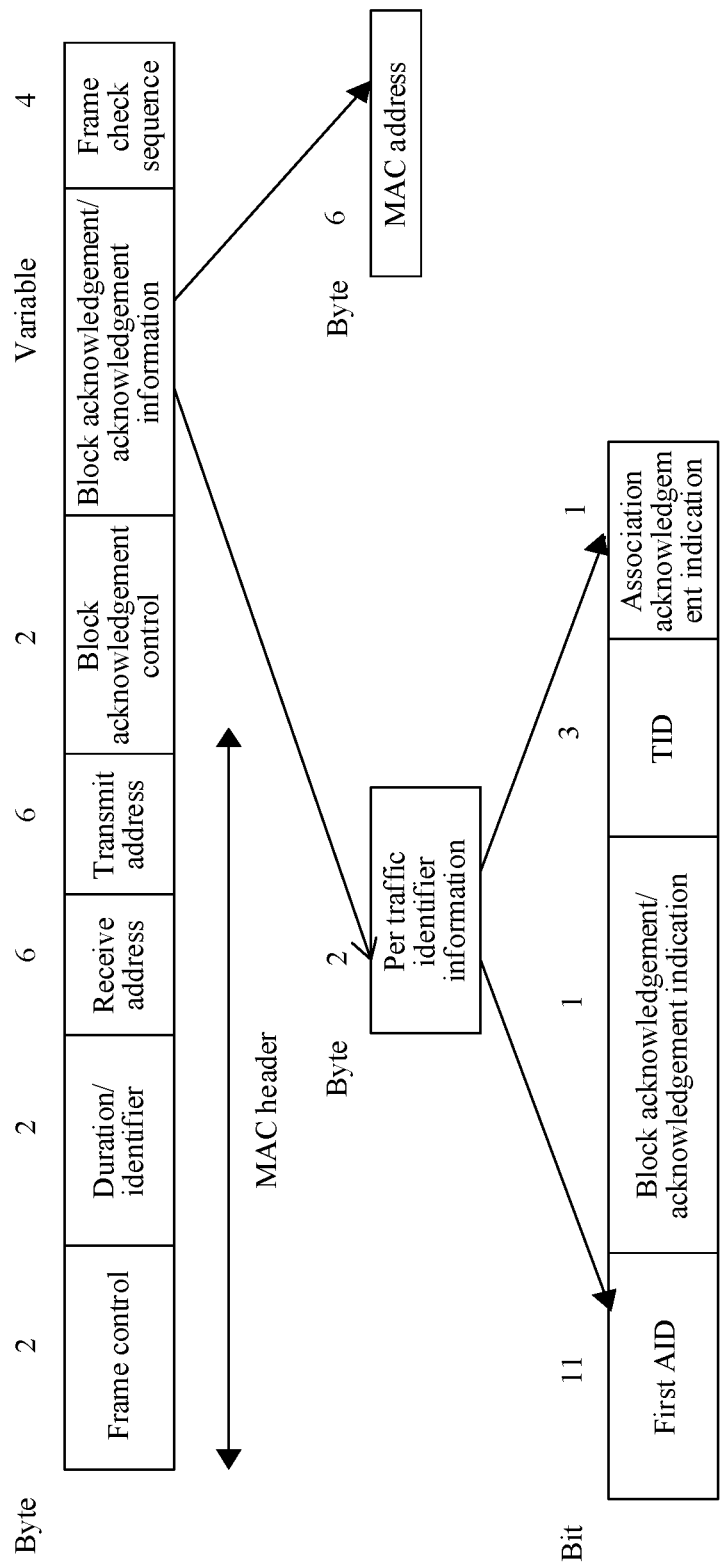
FIG. 23 is an eighth schematic structural diagram of an M-BA frame according to an embodiment of the present invention.

In still another optional manner, 1 bit in a traffic identifier TID in the association acknowledgement information is further used to indicate that the association acknowledgement information is the acknowledgement information of the association request message. FIG. 23 is an eighth schematic structural diagram of an M-BA frame according to an embodiment of the present invention. As shown in FIG. 23, a TID is usually filled in the 13th to the 16th bits in per traffic identifier information. However, based on an EDCA technology, there are usually eight types of TIDs in an M-BA frame. These eight types of TIDs need to be indicated by occupying only 3 bits. However, 4 bits are allocated to the TID in the per traffic identifier information. Therefore, 3 bits of the TIDs may still be used to indicate a TID in a corresponding MAC frame to be acknowledged. Therefore, the other bit in the TID may be used to indicate that the block acknowledgement/acknowledgement information is acknowledgement information of the association request message. The bit is an association acknowledgement indication bit in FIG. 23. In an example of an implementation, the bit is the last bit in the TID. It may be understood that the bit may be any one of the $13^{th}$ to the $16^{th}$ bits in the per traffic identifier information.

Specifically, a value of the association indication bit may be specifically as follows: For example, if the bit is set to 1, it indicates that the block acknowledgement/acknowledgement information is acknowledgement information of the association request message; otherwise, it indicates that the block acknowledgement/acknowledgement information is not acknowledgement information of the association request message. Further, a MAC address in the M-BA frame is located after per traffic identifier information and occupies 6 bytes. In this case, a first AID that is allocated by the AP to a station that successfully sends an association request is filled in an AID subfield in each traffic identifier field. It should be noted that a name of the first AID may be Pre-AID or another similar name.

Figure 6:
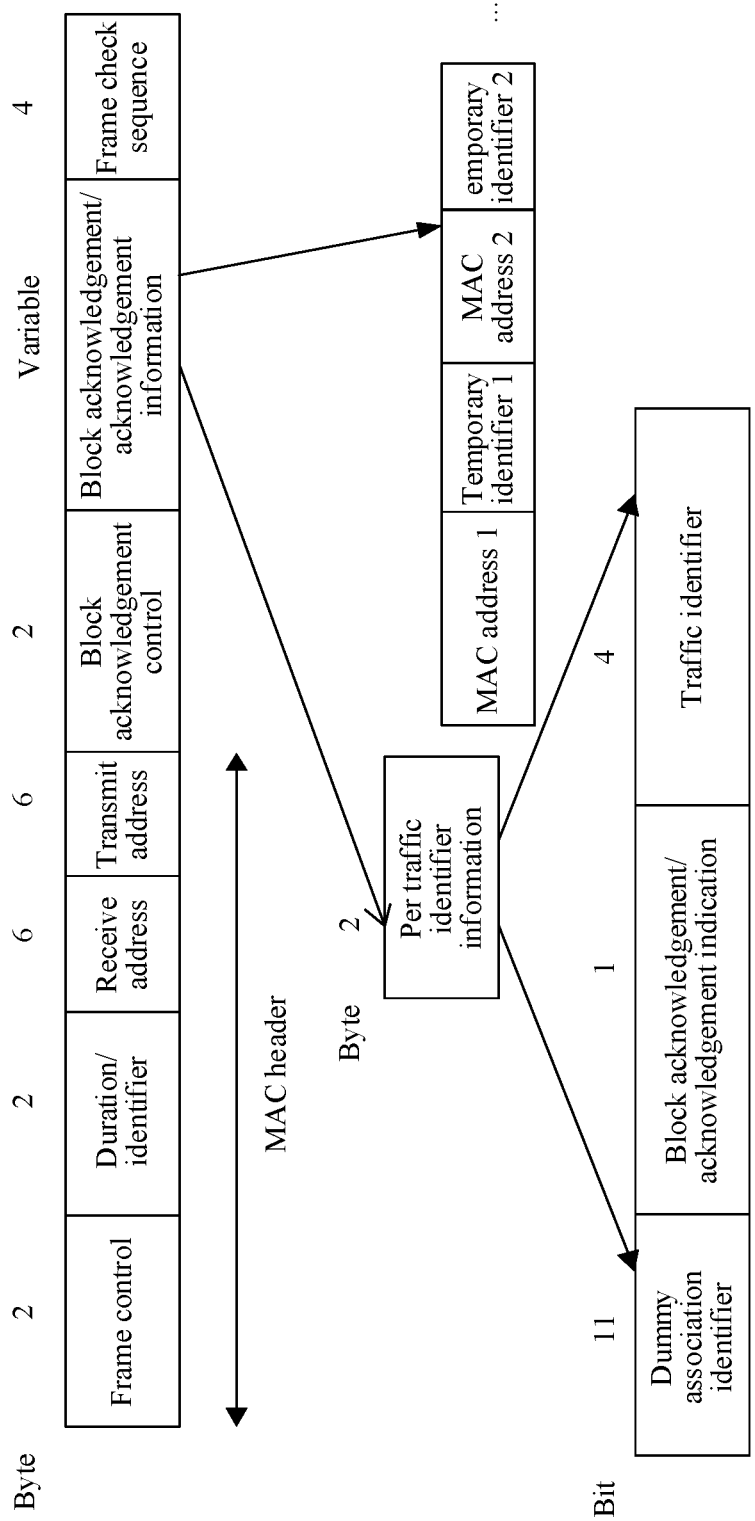
FIG. 6 is a fifth schematic structural diagram of an M-BA frame according to an embodiment of the present invention.

Further, a piece of BA/ACK Info in one M-BA frame may include acknowledgements of association requests sent by multiple unassociated STAs. That is, the M-BA frame includes one piece of BA/ACK Info. The BA/ACK Info includes acknowledgements of association requests sent by multiple unassociated STAs. FIG. 6 is a fifth schematic structural diagram of an M-BA frame according to an embodiment of the present invention. As shown in FIG. 6, the M-BA frame includes one piece of BA/ACK Info. The BA/ACK Info includes multiple MAC addresses and temporary identifiers or first AIDs corresponding to the MAC addresses. The following specifically describes how to determine a quantity of STAs to which the AP sends acknowledgement requests by using a same piece of association acknowledgement information.

1. A special traffic identifier TID or all 4 bits of a TID in the association acknowledgement information indicates or indicate a quantity of second STAs to which the AP sends acknowledgement requests by using a same piece of association acknowledgement information. Such a method is not applicable to a case in which a special TID is used to indicate that the association acknowledgement information is the acknowledgement information of the association request message. In the other cases, indication can be performed in such a manner. For example, if a value of a TID is 8, corresponding to the association acknowledgement information, an acknowledgement is sent to one STA. If a value of a TID is 9, corresponding to the association acknowledgement information, acknowledgements are sent to two STAs. Optionally, all the 4 bits of the TID are used to indicate a quantity of STAs to which the association acknowledgement information is sent for acknowledgement.

In another implementation, a range of a special traffic identifier TID or all 4 bits of a TID may be used to indicate how much byte information follows per traffic identifier information in the association acknowledgement information. For example, 2 bytes are used as a unit.

2. The M-BA frame further includes a statistical identifier, and the statistical identifier indicates a quantity of second STAs to which the AP sends acknowledgement requests by using a same piece of association acknowledgement information. On one hand, the statistical identifier may be located after the per traffic identifier information, and the AP may fixedly allocate bits to the statistical identifier. On the other hand, a block acknowledgement starting sequence is located after the per traffic identifier information, and the statistical identifier occupies a bit reserved in block acknowledgement starting sequence control in the M-BA frame. FIG. 7 is a schematic diagram of a block acknowledgement starting sequence control field according to an embodiment of the present invention. As shown in FIG. 7, the block acknowledgement starting sequence control includes 4 reserved bits and a starting sequence number. Therefore, when the starting sequence number is a special starting sequence number, for example, all 0s, the statistical identifier may be filled in the reserved bits. Notably, the statistical identifier may be further at another location of the M-BA frame. This is not limited in the present invention.

It should be noted that in this embodiment of the present invention, after per traffic identifier information, if a MAC address follows, a temporary identifier/first AID may be further included; or if multiple MAC addresses follow, multiple temporary identifiers/first AIDs may be further included. In this case, 0 needs to be filled to ensure that a bit quantity required by the foregoing content is a multiple of 8. That is, 1 byte is used as a unit, or 10 bytes are used as a unit.

FIG. 8 is a flowchart of an association establishment method according to another embodiment of the present invention. The method is performed by a first STA. The method specifically includes the following procedure.

S801. The first station STA receives a trigger frame broadcast by an access point AP, where the trigger frame is used to indicate one or more available subchannel and trigger multiple first stations STAs to perform uplink data transmission at the same time.

Specifically, the first STA herein is a STA with which the AP does not establish any association. Usually, the trigger frame broadcast by the AP may indicate, by using a resource allocation indication bit, which STAs transmit data on which available subchannels, or may indicate, by using a resource allocation indication bit, which available subchannels are used by the multiple first STAs by means of random access, so that the first STAs contend for an available subchannel by using a random backoff algorithm. Because no association is established between the AP and the first STA, the trigger frame can be only the latter one. That is, the trigger frame is used to indicate one or more available subchannel.

S802. The first STA sends an association request message on a corresponding available subchannel, where the association request message includes a Media Access Control MAC address of the first STA.

S803. The first STA receives a multi-block acknowledgement M-BA frame broadcast by the AP, where the M-BA frame includes one or more piece of association acknowledgement information, and the association acknowledgement information is acknowledgement information of the association request message.

S804. If the trigger frame includes a temporary identifier that is allocated by the AP to each available subchannel, the M-BA frame includes a MAC address of one or more second STA; and if the first STA finds that the MAC address of the first STA is in the M-BA frame, the first STA determines that the association acknowledgement information is acknowledgement information sent by the AP to the first STA and uses a temporary identifier of a corresponding available subchannel as a first AID of the first STA; if the trigger frame includes no temporary identifier that is allocated by the AP to each available subchannel, the M-BA frame includes a MAC address of one or more second STA and a first AID that is allocated by the AP to the second STA; and if the first STA finds that the MAC address of the first STA is in the M-BA frame, the first STA obtains a first AID corresponding to the MAC address of the first STA, where the second STA is a STA corresponding to the association request message successfully received by the AP.

Specifically, after determining that the M-BA frame is an association request message, the first STA searches the M-BA frame for a MAC address of the first STA. If the MAC address of the first STA is found, it indicates that acknowledgement information including the MAC address is sent by the AP to the first STA. In this case, there are two cases. In case 1, if the trigger frame includes the temporary identifier allocated by the AP to each available subchannel, when the first STA receives the trigger frame, the first STA already uses the temporary identifier as a first AID of the first STA. The first AID herein may be considered as a temporary identifier allocated by the AP to the first STA. Because the first STA has not received the association response message sent by the AP to the first STA, an AID (that is, a second AID to be mentioned below) actually allocated by the AP to the first STA may be different from the first AID. Certainly, if the trigger frame includes the temporary identifier allocated by the AP to each available subchannel, the M-BA frame may further include a temporary identifier of an available subchannel corresponding to the second STA. In case 2, if the trigger frame does not include the temporary identifier allocated by the AP to each available subchannel, the M-BA frame includes the MAC address of the one or more second STA and the first AID that is allocated by the AP to the second STA. If the first STA finds that the MAC address of the first STA is in the M-BA frame, the first STA obtains a first AID corresponding to the MAC address of the first STA.

Specifically, the first STA first determines, by using a temporary identifier in each traffic identifier, or a special TID, or 1 bit in a TID in block acknowledgement/acknowledgement information in the M-BA frame, or a dummy association identifier, whether the block acknowledgement/acknowledgement information is acknowledgement information of the association request message. Then, the first STA determines, by using a MAC address following each traffic identifier, whether the block acknowledgement/acknowledgement information is an association request sent to the first STA for acknowledgement.

S805. The first STA receives an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

Specifically, in step S804, it is assumed that the AP successfully receives the association request message sent by the first STA. Therefore, in step S805, the first STA receives the association response message that is sent by the AP according to the first AID by means of OFDMA. The second AID included in the association response message is a final and actual AID allocated by the AP to the first STA. Subsequently, the AP may communicate with the first STA by using the second AID.

This embodiment of the present invention provides the association establishment method, including: receiving, by the first station STA, the trigger frame broadcast by the access point AP; receiving, by the first STA, the multi-block acknowledgement M-BA frame broadcast by the AP, where if the trigger frame includes the temporary identifier that is allocated by the AP to each available subchannel, the M-BA frame includes the MAC address of one or more second STA; and if the first STA finds that the MAC address of the first STA is in the M-BA frame, the first STA determines that association acknowledgement information is the acknowledgement information sent by the AP to the first STA and uses the temporary identifier of the corresponding available subchannel as the first AID of the first STA; if the trigger frame includes no temporary identifier that is allocated by the AP to each available subchannel, the M-BA frame includes the MAC address of one or more second STA and the first AID that is allocated by the AP to the second STA; and if the first STA finds that a MAC address of the first STA is in the M-BA frame, the first STA obtains the first AID corresponding to the MAC address of the first STA, where the second STA is the STA corresponding to the association request message successfully received by the AP; and receiving, by the first STA, the association response message that is sent by the AP according to the first AID by means of OFDMA, where the association response message includes the second AID. Because the AP adds the MAC address to the association acknowledgement information of the M-BA frame, provided that the first STA reads the MAC address of the first STA, the first STA can determine that the acknowledgement information sent by the AP to the first STA exists in the association acknowledgement information, obtain the first AID, and finally, obtain the second AID. In this way, the AP is associated with the STA, and communication reliability is ensured.

Usually, one M-BA frame may include one or more piece of association acknowledgement information, or may include common acknowledgement information. The common acknowledgement information is not acknowledgement information of the association request message. The following describes in detail how to differentiate whether acknowledgement information in an M-BA frame is association acknowledgement information or common acknowledgement information.

Case 1. If the trigger frame includes the temporary identifier allocated by the AP to each available subchannel, the association acknowledgement information further includes the temporary identifier of the available subchannel corresponding to the second STA. The temporary identifier is further used to indicate that the association acknowledgement information is the acknowledgement information of the association request message. In this case, the first STA already uses, as a first AID of the first STA by default, a temporary identifier of a subchannel used when the first STA sends an association request message. Therefore, after the first STA receiving an M-BA frame, if the first STA learns, by means of reading, that a default temporary identifier obtained by the first STA is included in a piece of BA/ACK Info in the M-BA frame, it indicates that the BA/ACK Info is association acknowledgement information. As shown in FIG. 3A, the first STA reads a MAC address that is located after per traffic identifier information, and then determines whether the MAC address is a MAC address of the first STA. If the MAC address is the MAC address of the first STA, it indicates that the AP successfully receives the association request message from the first STA. If the M-BA frame further includes a temporary identifier of an available subchannel corresponding to the first STA, in addition to determining, by using the MAC address, whether the acknowledgement information is sent to the first STA, the first STA may further determine, by using the temporary identifier, whether the acknowledgement information is sent to the first STA.

Case 2. The association acknowledgement information further includes a dummy association identifier. The dummy association identifier is used to indicate that the association acknowledgement information is the acknowledgement information of the association request message. The dummy association identifier may be indicated by using 11 bits of 0, or may be a special identifier specified by the AP. As shown in FIG. 4, after receiving the M-BA frame, if the first STA reads the dummy association identifier, it is considered that the BA/ACK Info in the M-BA frame is association acknowledgement information. The first STA reads a MAC address that is located after per traffic identifier information, and then, determines whether the MAC address is a MAC address of the first STA. If the MAC address is the MAC address of the first STA, it indicates that the AP successfully receives the association request message from the first STA.

Case 3. The association acknowledgement information further includes a special TID. The special TID is used to indicate that the association acknowledgement information is the acknowledgement information of the association request message. Based on an EDCA technology, there are usually eight types of TIDs in an M-BA frame. These eight types of TIDs need to occupy only 3 bits. However, 4 bits are allocated to a TID in per traffic identifier information. Therefore, a TID whose values are 0 to 7 may indicate a normal TID, and a TID whose values are 8 to 15 is a special TID. Therefore, a special TID may indicate that block acknowledgement/acknowledgement information is acknowledgement information of the association request message. As shown in FIG. 5, after receiving the M-BA frame, if the first STA reads a special TID, it is considered that the BA/ACK Info in the M-BA frame is association acknowledgement information. The first STA reads a MAC address that is located after per traffic identifier information, and then, determines whether the MAC address is a MAC address of the first STA. If the MAC address is the MAC address of the first STA, it indicates that the AP successfully receives the association request message from the first STA.

Case 4. The association acknowledgement information further includes an association acknowledgement indication. The association acknowledgement indication is 1 bit of a TID subfield in each traffic identifier field, and is used to indicate that the association acknowledgement information is the acknowledgement information of the association request message. As shown in FIG. 23, after receiving the M-BA frame, if the first STA reads an association acknowledgement indication, and if the bit indication is association acknowledgement information, it is considered that the BA/ACK Info in the M-BA frame is association acknowledgement information. The first STA reads a MAC address that is located after per traffic identifier information, and then, determines whether the MAC address is a MAC address of the first STA. If the MAC address is the MAC address of the first STA, it indicates that the AP successfully receives the association request message from the first STA. In addition, the STA obtains a first AID that is allocated by the AP in an AID subfield in each traffic identifier field by means of the M-BA frame.

Further, a piece of BA/ACK Info in one M-BA frame may include acknowledgements of association requests sent by multiple unassociated STAs. That is, the M-BA frame includes one piece of BA/ACK Info. The BA/ACK Info includes acknowledgements of association requests sent by multiple unassociated STAs. As shown in FIG. 6, the M-BA frame includes one piece of BA/ACK Info. The block acknowledgement information includes multiple MAC addresses and temporary identifiers or first AIDs corresponding to the MAC addresses. The following specifically describes how to determine a quantity of STAs to which the AP sends acknowledgement requests by using a same piece of association acknowledgement information.

1. A special traffic identifier TID or all 4 bits of a TID in the association acknowledgement information indicates or indicate a quantity of second STAs to which the AP sends acknowledgement requests by using a same piece of association acknowledgement information. Certainly, such a case cannot be based on case 3 described above.

2. The M-BA frame further includes a statistical identifier, and the statistical identifier indicates a quantity of second STAs to which the AP sends acknowledgement requests by using a same piece of association acknowledgement information. The statistical identifier is located after per traffic identifier information in the M-BA frame. Alternatively, the statistical identifier occupies a bit reserved in block acknowledgement starting sequence control in the M-BA frame.

It should be noted that in this embodiment of the present invention, after per traffic identifier information, if a MAC address follows, a temporary identifier/first AID may be further included; or if multiple MAC addresses follow, multiple temporary identifiers/first AIDs may be further included. In this case, 0 needs to be filled to ensure that a bit quantity required by the foregoing content is a multiple of 8. That is, a byte is used as a unit, or 10 bytes are used as a unit.

The following describes an association establishment process.

Figure 9:
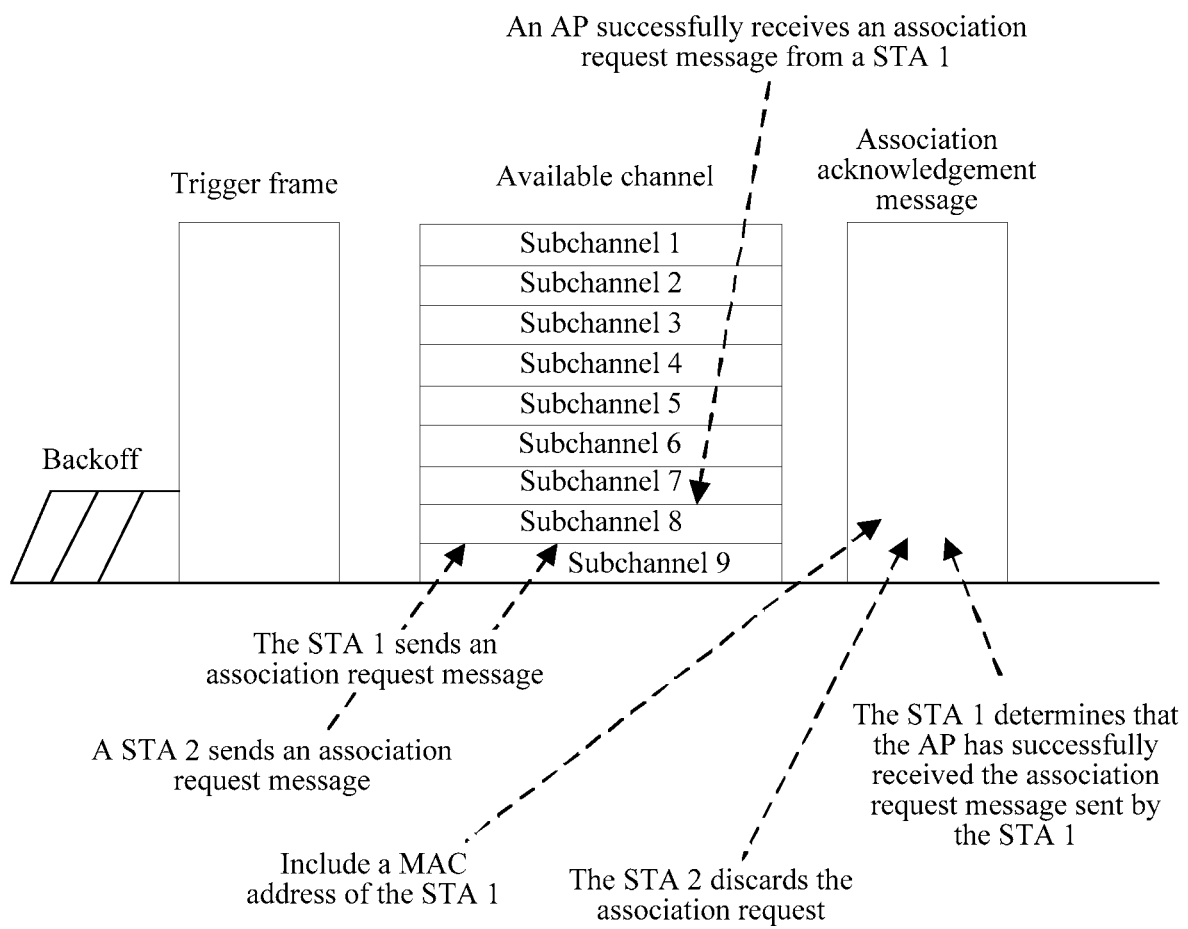
FIG. 9 is a schematic diagram of sending an association request message and an association acknowledgement message according to an embodiment of the present invention.

FIG. 9 is a schematic diagram of sending an association request message and an association acknowledgement message according to an embodiment of the present invention. The association acknowledgement message herein may be construed as an M-BA frame including one or more piece of association acknowledgement information. As shown in FIG. 9, an AP broadcasts a trigger frame. The trigger frame indicates that available subchannels are a subchannel 1 to a subchannel 9. A STA 1 and STA 2 send respective association request messages by using a subchannel 8. Then, the AP broadcasts an M-BA frame. The M-BA frame includes one or more piece of association acknowledgement information. The association acknowledgement information is acknowledgement information of an association request message. In this case, the STA 1 finds a MAC address of the STA 1 after reading a piece of association acknowledgement information. Then the STA 1 determines that the AP has successfully received an association request message sent by the STA 1, where the M-BA frame includes acknowledgement information for the STA 1, and the STA 1 obtains a first AID.

Figure 10:
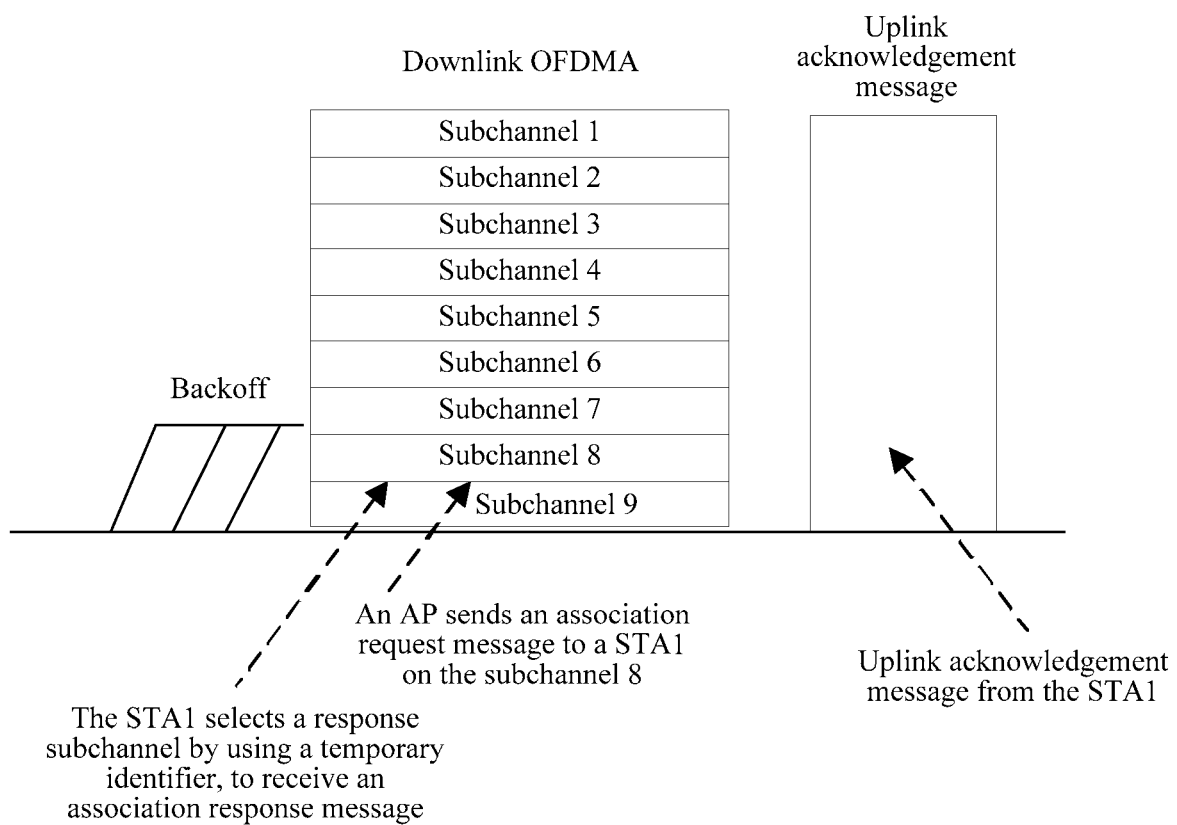
FIG. 10 is a schematic diagram of sending an association response message and an acknowledgement message according to an embodiment of the present invention.

Usually, after a STA receives an association response message sent by the AP to the STA, the STA may send an uplink acknowledgement message to the AP. FIG. 10 is a schematic diagram of sending an association response message and an acknowledgement message according to an embodiment of the present invention. As shown in FIG. 10, an AP sends an association response message to a STA 1 by means of downlink OFDMA. A resource indication bit in downlink OFDMA indicates, by using a temporary identifier (first AID), that the STA 1 receives an association response on a subchannel. As shown in FIG. 10, the subchannel is a subchannel 8. It may be understood that the subchannel selection method depends on which subchannel is better for the STA 1 to receive the association response.

Figure 11:
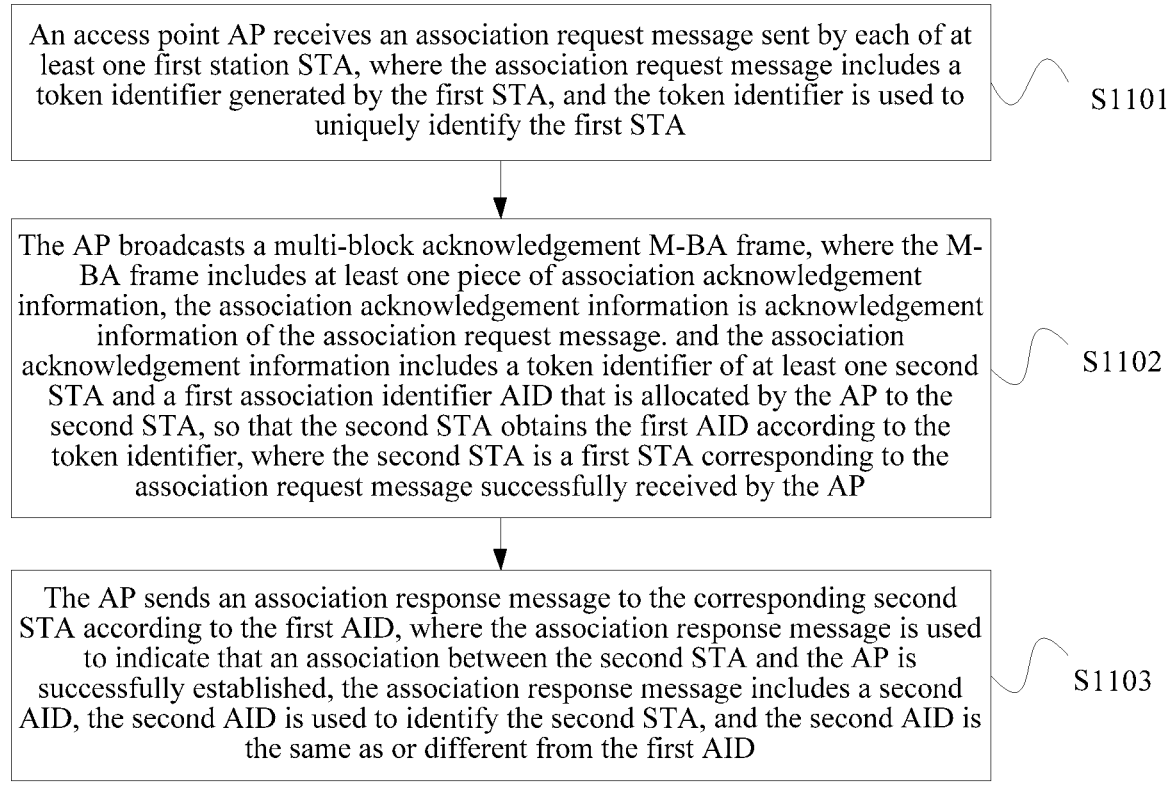
FIG. 11 is a flowchart of an association establishment method according to still another embodiment of the present invention.

FIG. 11 is a flowchart of an association establishment method according to still another embodiment of the present invention. The method is performed by an AP. The method specifically includes the following procedure:

S1101. The access point AP receives an association request message sent by each of one or more first station STA, where the association request message includes a token identifier generated by the first STA, and the token identifier is used to uniquely identify the first STA.

S1102. The AP broadcasts a multi-block acknowledgement M-BA frame, where the M-BA frame includes one or more piece of association acknowledgement information, the association acknowledgement information is acknowledgement information of the association request message, and the association acknowledgement information includes a token identifier of one or more second STA and a first association identifier AID that is allocated by the AP to the second STA, so that the second STA obtains the first AID according to the token identifier, where the second STA is a first STA corresponding to the association request message successfully received by the AP.

S1103. The AP sends an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

Specifically, the AP sends the association response message to the corresponding second STA according to the first AID in an OFDMA manner. Usually, the token identifier generated by each first STA occupies 11 bits. Therefore, the token identifiers are usually different from each other. When receiving the association request message sent by the first STA, the AP obtains the token identifier of each first STA. Because the token identifier may be the same as an AID of another STA already associated with the AP, the AP allocates a first AID to each first STA and broadcasts an M-BA frame. The association acknowledgement information includes a token identifier of one or more second STA and a first association identifier AID that is allocated by the AP to the second STA. When a first STA finds a token identifier of the first STA, it indicates that the AP receives an association request message from the first STA, and the first STA may further read an M-BA frame, to obtain a first AID. Finally, the AP sends the association response message to the corresponding second STA according to the first AID by means of OFDMA. The association response message is used to indicate that an association between the second STA and the AP is successfully established. The association response message includes a second AID.

This embodiment of the present invention provides the association establishment method. In the method, the AP allocates the first AID to the first STA according to the token identifier of the first STA. Therefore, the first STA can obtain the first AID provided that the first STA reads the token identifier of the first STA. Finally, the AP allocates a second AID to the first STA according to the first AID. In this way, the AP is associated with the first STA, and further communication reliability is ensured.

Figure 12:
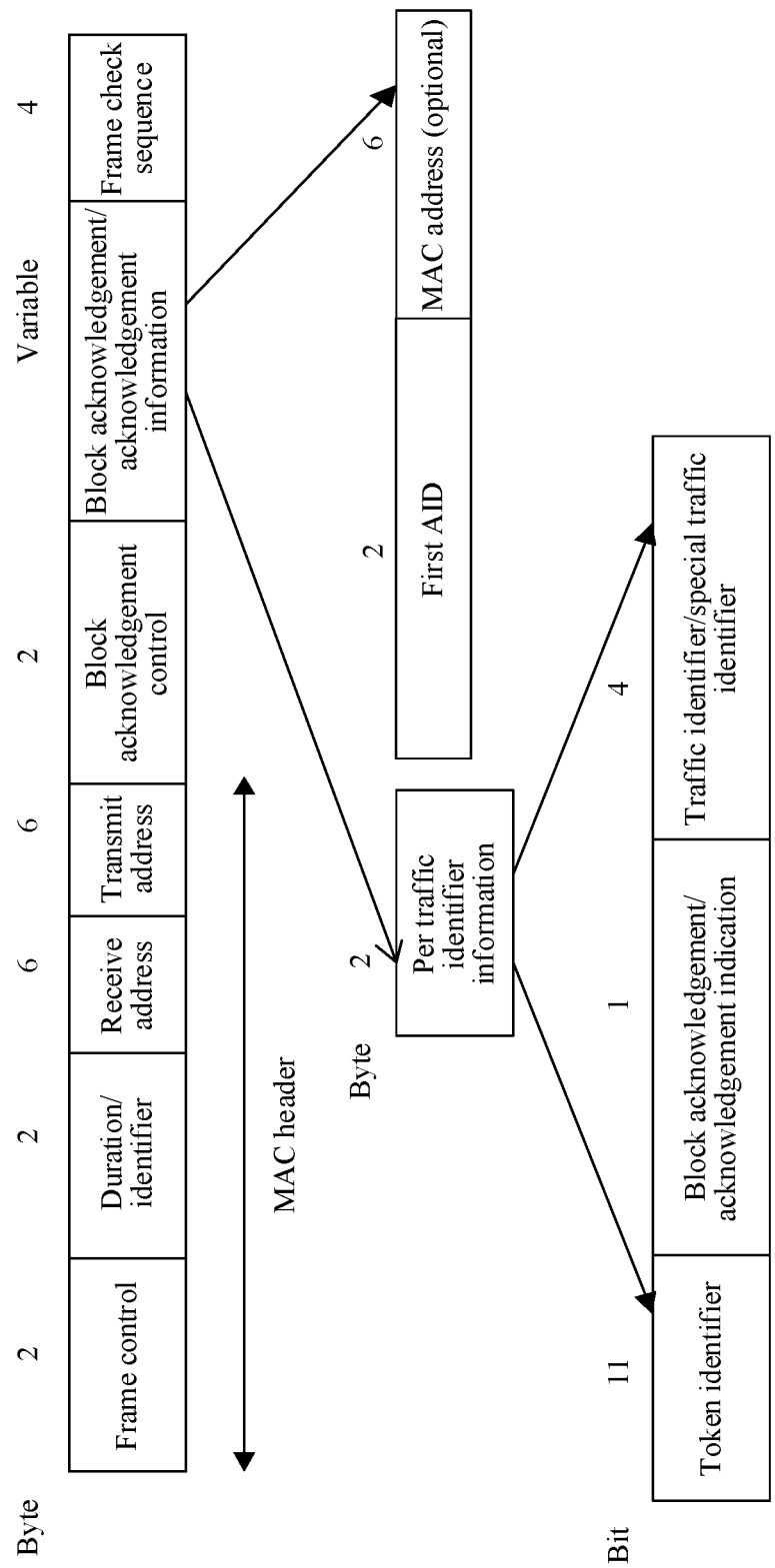
FIG. 12 is a sixth schematic structural diagram of an M-BA frame according to an embodiment of the present invention.
Figure 13:
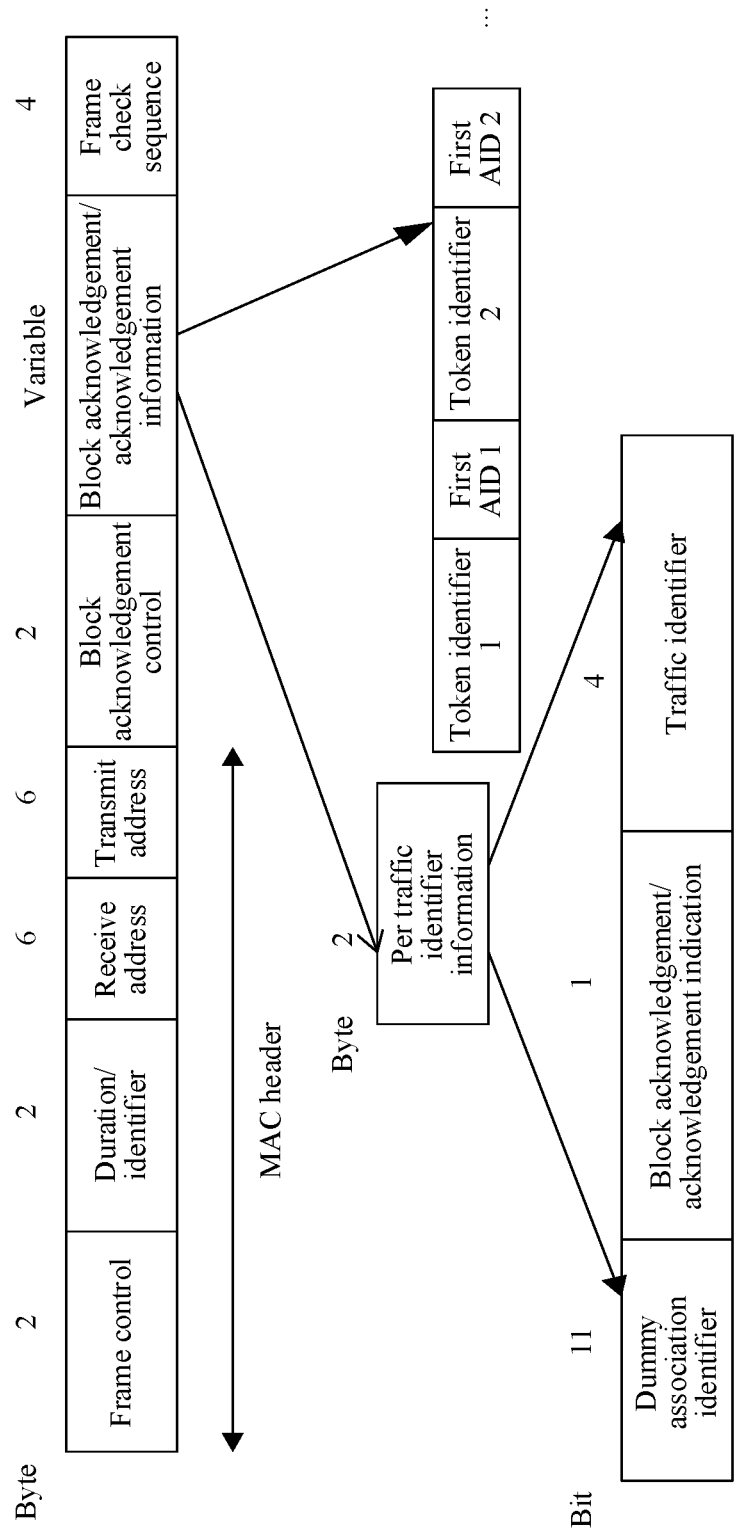
FIG. 13 is a seventh schematic structural diagram of an M-BA frame according to an embodiment of the present invention.

Further, the association request message further includes a MAC address of the first STA. Therefore, the association acknowledgement information may further include a MAC address of the second STA. FIG. 12 is a sixth schematic structural diagram of an M-BA frame according to an embodiment of the present invention. As shown in FIG. 12, the M-BA frame includes a token identifier and a first AID. The token identifier further has a function: The token identifier may indicate that association acknowledgement information including the token identifier is acknowledgement information of an association request message. Optionally, the M-BA frame further includes a MAC address. FIG. 13 is a seventh schematic structural diagram of an M-BA frame according to an embodiment of the present invention. As shown in FIG. 13, the M-BA frame includes multiple token identifiers, multiple first AIDs, and a dummy association identifier. The dummy association identifier herein is used to identify that association acknowledgement information including the dummy association identifier is acknowledgement information of an association request message. The dummy association identifier may be indicated by using 11 bits of 0, or may be a special identifier specified by the AP. Optionally, the M-BA frame may further include multiple MAC addresses.

It should be noted that in this embodiment of the present invention, after per traffic identifier information, if a token identifier and a first AID are included, a MAC address is optionally included, or if multiple token identifiers and multiple first AIDs are included, multiple MAC addresses are optionally included. In this case, 0 needs to be filled to ensure that a bit quantity required by the foregoing content is a multiple of 8. That is, a byte is used as a unit, or 10 bytes are used as a unit.

Still further, it may be determined, by using a token identifier in a piece of association acknowledgement information in the M-BA frame, that the association acknowledgement information is acknowledgement information of the association request message. Alternatively, it may be indicated, by using a dummy association identifier or a special traffic identifier TID, that the M-BA frame is acknowledgement information of the association request message. This is specifically the same as the manner in the foregoing embodiment. Details are not described herein again.

Still further, it may be determined, by using a 1-bit association acknowledgement indication in a traffic identifier TID in a piece of association acknowledgement information in the M-BA frame, that the association acknowledgement information is acknowledgement information of the association request message.

Optionally, a special traffic identifier TID or all 4 bits of a TID in the association acknowledgement information indicates or indicate a quantity of second STAs to which the AP sends acknowledgement requests by using a same piece of association acknowledgement information.

Optionally, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information, or the statistical identifier occupies a bit reserved in block acknowledgement starting sequence control in the association acknowledgement information. This is specifically the same as the manner in the foregoing embodiment. Details are not described herein again.

Figure 14:
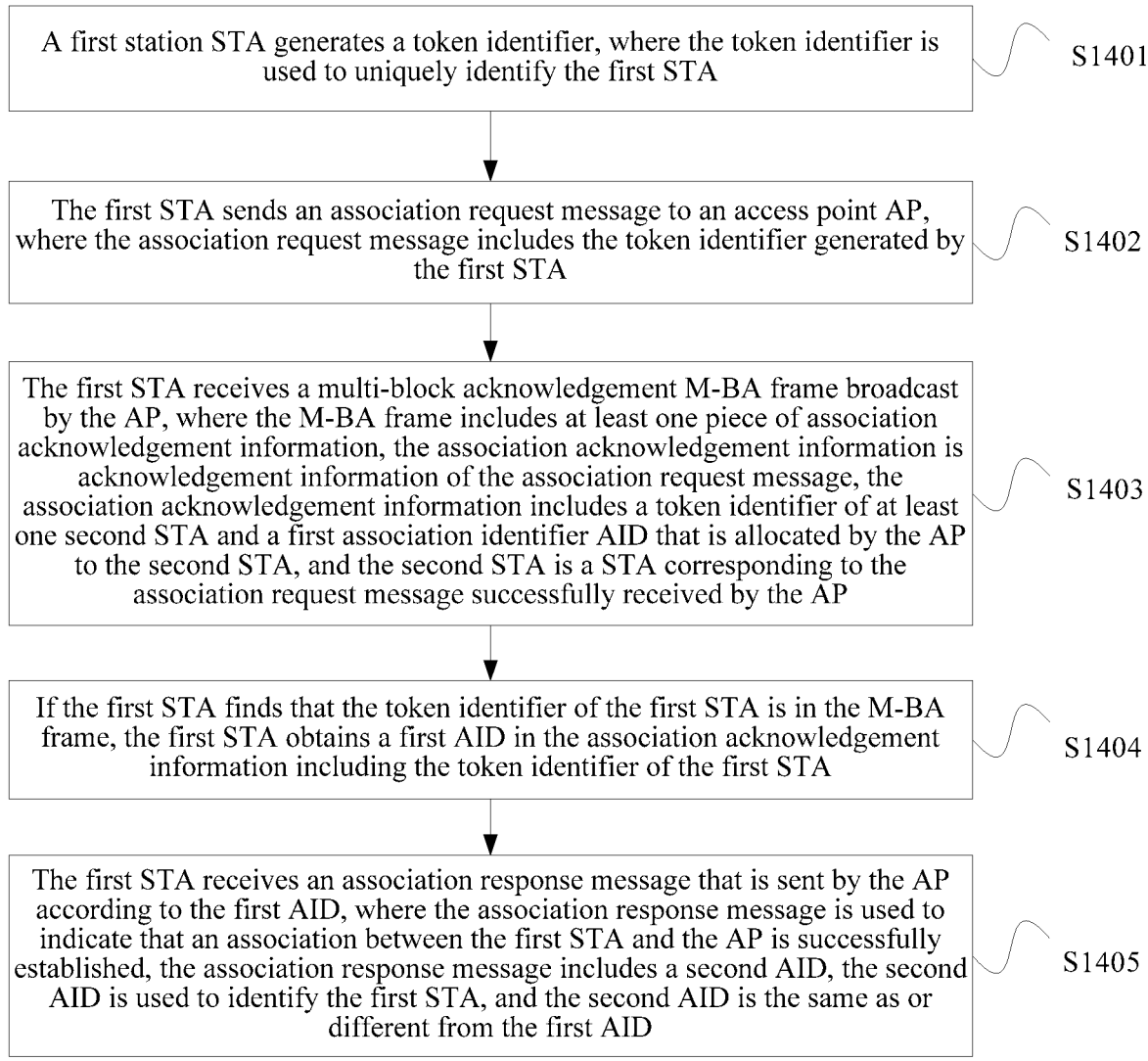
FIG. 14 is a flowchart of an association establishment method according to yet another embodiment of the present invention.

FIG. 14 is a flowchart of an association establishment method according to yet another embodiment of the present invention. The method is performed by a first STA. The method specifically includes the following procedure:

S1401. The first station STA generates a token identifier, where the token identifier is used to uniquely identify the first STA.

S1402. The first STA sends an association request message to an access point AP, where the association request message includes the token identifier generated by the first STA.

S1403. The first STA receives a multi-block acknowledgement M-BA frame broadcast by the AP, where the M-BA frame includes one or more piece of association acknowledgement information, the association acknowledgement information is acknowledgement information of the association request message, the association acknowledgement information includes a token identifier of one or more second STA and a first association identifier AID that is allocated by the AP to the second STA, and the second STA is a STA corresponding to the association request message successfully received by the AP.

S1404. If the first STA finds that the token identifier of the first STA is in the M-BA frame, the first STA obtains a first AID in the association acknowledgement information including the token identifier of the first STA.

S1405. The first STA receives an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

Specifically, the token identifier generated by the first STA occupies 11 bits. When receiving the M-BA frame sent by the AP, the first STA first checks whether the token identifier of the first STA is in per traffic identifier information in a piece of BA/ACK Info in the M-BA frame. If the token identifier of the first STA is in the per traffic identifier information, the first STA further reads a first AID located after the per traffic identifier information. The first AID is allocated by the AP to the first STA. Then, the first STA receives an association response message that is sent by the AP according to the first AID in an OFDMA manner. The association response message is used to indicate that an association between the first STA and the AP is successfully established. The association response message includes a second AID, the second AID is used to identify the first STA, and the second AID is the same as or different from the first AID.

This embodiment of the present invention provides the association establishment method. In the method, the first STA generates the token identifier, so that the AP allocates the first AID to the first STA according to the token identifier of the first STA. In this way, the first STA can obtain the first AID provided that the first STA reads the token identifier of the first STA. In this case, the first STA is converted into a second STA. Finally, the AP sends an association response to the second STA according to the first AID by means of OFDMA, and allocates a second AID to the second STA. In this way, the AP is associated with the first STA, and further communication reliability is ensured.

Further, the association request message further includes a MAC address of the first STA. Therefore, the association acknowledgement information further includes a MAC address of the second STA.

Still further, it may be determined, by using a token identifier in a piece of association acknowledgement information in the M-BA frame, that the association acknowledgement information is acknowledgement information of the association request message. Alternatively, it may be indicated, by using a dummy association identifier or a special traffic identifier TID, that the M-BA frame is acknowledgement information of the association request message. This is specifically the same as the manner in the foregoing embodiment. Details are not described herein again.

Still further, it may be determined, by using a 1-bit association acknowledgement indication in a traffic identifier TID in a piece of association acknowledgement information in the M-BA frame, that the association acknowledgement information is acknowledgement information of the association request message.

Optionally, a special traffic identifier TID or all 4 bits of a TID in the association acknowledgement information indicates or indicate a quantity of second STAs to which the AP sends acknowledgement requests by using a same piece of association acknowledgement information.

Optionally, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information. This is specifically the same as the manner in the foregoing embodiment. Details are not described herein again.

Figure 15:
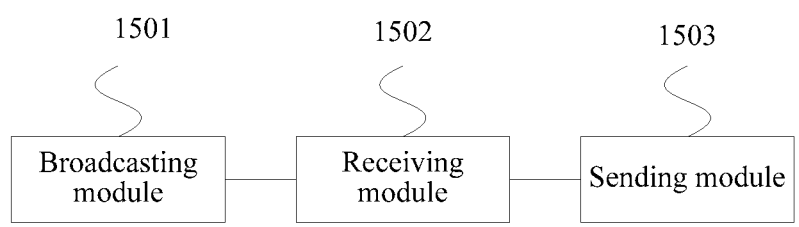
FIG. 15 is a first schematic structural diagram of an association establishment apparatus according to an embodiment of the present invention.

FIG. 15 is a first schematic structural diagram of an association establishment apparatus according to an embodiment of the present invention. The apparatus is an access point AP, and includes:

a broadcasting module 1501, configured to broadcast a trigger frame, where the trigger frame is used to indicate one or more available subchannel and trigger multiple first stations STAs to perform uplink data transmission at the same time;

a receiving module 1502, configured to receive an association request message sent on a corresponding available subchannel by each of the multiple first STAs, where the association request message includes a Media Access Control MAC address of the first STA, where the broadcasting module 1501 is further configured to broadcast a multi-block acknowledgement M-BA frame, where the M-BA frame includes one or more piece of association acknowledgement information, and the association acknowledgement information is acknowledgement information of the association request message, where if the trigger frame includes a temporary identifier that is allocated by the AP to each available subchannel, the association acknowledgement information includes a MAC address of one or more second STA, so that each second STA determines that the association acknowledgement information is acknowledgement information sent by the AP to the second STA and uses a temporary identifier of a corresponding available subchannel as a first AID of the second STA, where the second STA is a first STA corresponding to the association request message successfully received by the AP; otherwise, the association acknowledgement information includes a MAC address of one or more second STA and a first AID that is allocated by the AP to the second STA; and a sending module 1503, configured to send an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

The association establishment apparatus provided in this embodiment can be configured to perform the method steps in the embodiment shown in FIG. 2. Their implementation principles and technical effects are similar, and details are not described herein again.

Further, if the trigger frame includes the temporary identifier that is allocated by the AP to each available subchannel, the association acknowledgement information further includes the temporary identifier of the available subchannel corresponding to the second STA.

In an optional manner, the temporary identifier included in the association acknowledgement information is further used to indicate that the association acknowledgement information is the acknowledgement information of the association request message.

In another optional manner, the association acknowledgement information further includes a dummy association identifier, and the dummy association identifier is used to indicate that the association acknowledgement information is the acknowledgement information of the association request message.

In still another optional manner, a special traffic identifier TID in the association acknowledgement information is further used to indicate that the association acknowledgement information is the acknowledgement information of the association request message.

In still another optional manner, 1 bit in a traffic identifier TID in the association acknowledgement information is further used to indicate that the association acknowledgement information is the acknowledgement information of the association request message.

Still further, a special traffic identifier TID or all 4 bits of a TID in the association acknowledgement information indicates or indicate a quantity of second STAs to which the AP sends acknowledgement requests by using a same piece of association acknowledgement information.

Alternatively, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information, or the statistical identifier occupies a bit reserved in block acknowledgement starting sequence control in the association acknowledgement information.

Figure 16:
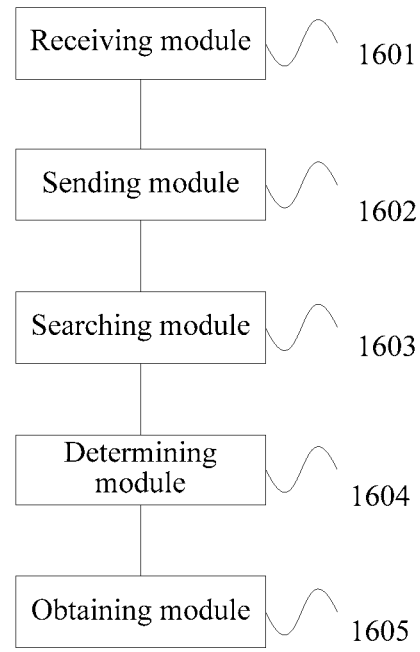
FIG. 16 is a second schematic structural diagram of an association establishment apparatus according to an embodiment of the present invention.

FIG. 16 is a second schematic structural diagram of an association establishment apparatus according to an embodiment of the present invention. The apparatus is a first station STA, and includes:

a receiving module 1601, configured to receive a trigger frame broadcast by an access point AP, where the trigger frame is used to indicate one or more available subchannel and trigger multiple first stations STAs to perform uplink data transmission at the same time; and a sending module 1602, configured to send an association request message on a corresponding available subchannel, where the association request message includes a Media Access Control MAC address of the first STA, where the receiving module 1601 is further configured to receive a multi-block acknowledgement M-BA frame broadcast by the AP, where the M-BA frame includes one or more piece of association acknowledgement information, and the association acknowledgement information is acknowledgement information of the association request message;

the apparatus further includes: a searching module 1603, a determining module 1604, and an obtaining module 1605; if the trigger frame includes a temporary identifier that is allocated by the AP to each available subchannel, the M-BA frame includes a MAC address of one or more second STA and if the searching module 1603 finds that the MAC address of the first STA is in the M-BA frame, the determining module 1604 determines that the association acknowledgement information is acknowledgement information sent by the AP to the determining module 1604 and uses a temporary identifier of a corresponding available subchannel as a first AID of the determining module 1604; otherwise, the M-BA frame includes a MAC address of one or more second STA and a first AID that is allocated by the AP to the second STA, and if the searching module 1603 finds that the MAC address of the first STA is in the M-BA frame, the obtaining module 1605 obtains a first AID corresponding to the MAC address of the first STA, where the second STA is a STA corresponding to the association request message successfully received by the AP; and the receiving module 1601 is further configured to receive an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

The association establishment apparatus provided in this embodiment can be configured to perform the method steps in the embodiment shown in FIG. 8. Their implementation principles and technical effects are similar, and details are not described herein again.

Further, if the trigger frame includes the temporary identifier that is allocated by the AP to each available subchannel, the association acknowledgement information further includes the temporary identifier of the available subchannel corresponding to the second STA.

In an optional manner, the temporary identifier included in the association acknowledgement information is further used to indicate that the association acknowledgement information is the acknowledgement information of the association request message.

In another optional manner, the association acknowledgement information further includes a dummy association identifier, and the dummy association identifier is used to indicate that the association acknowledgement information is the acknowledgement information of the association request message.

In still another optional manner, a special traffic identifier TID in the association acknowledgement information is further used to indicate that the association acknowledgement information is the acknowledgement information of the association request message.

In still another optional manner, 1 bit in a traffic identifier TID in the association acknowledgement information is further used to indicate that the association acknowledgement information is the acknowledgement information of the association request message.

Still further, a special traffic identifier TID or all 4 bits of a TID in the association acknowledgement information indicates or indicate a quantity of second STAs to which the AP sends acknowledgement requests by using a same piece of association acknowledgement information. The association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information.

Figure 17:
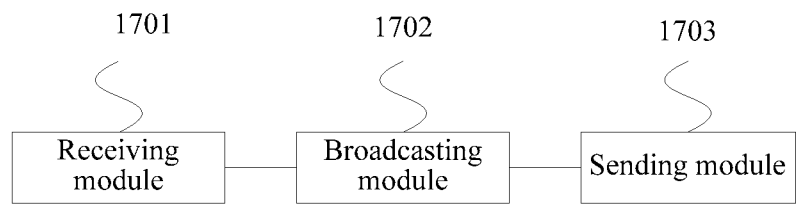
FIG. 17 is a third schematic structural diagram of an association establishment apparatus according to an embodiment of the present invention.

FIG. 17 is a third schematic structural diagram of an association establishment apparatus according to an embodiment of the present invention. The apparatus is an access point AP, includes:

a receiving module 1701, configured to receive an association request message sent by each of one or more first station STA, where the association request message includes a token identifier generated by the first STA, and the token identifier is used to uniquely identify the first STA;

a broadcasting module 1702, configured to broadcast a multi-block acknowledgement M-BA frame, where the M-BA frame includes one or more piece of association acknowledgement information, and the association acknowledgement information is acknowledgement information of the association request message, where the association acknowledgement information includes a token identifier of one or more second STA and a first association identifier AID that is allocated by the AP to the second STA, so that the second STA obtains the first AID according to the token identifier, where the second STA is a first STA corresponding to the association request message successfully received by the AP; and a sending module 1703, configured to send an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

The association establishment apparatus provided in this embodiment can be configured to perform the method steps in the embodiment shown in FIG. 13. Their implementation principles and technical effects are similar, and details are not described herein again.

Further, the association request message further includes a MAC address of the first STA. The association acknowledgement information further includes a MAC address of the second STA.

In an optional manner, a special traffic identifier TID or all 4 bits of a TID in the association acknowledgement information indicates or indicate a quantity of second STAs to which the AP sends acknowledgement requests by using a same piece of association acknowledgement information.

In another optional manner, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information.

Figure 18:
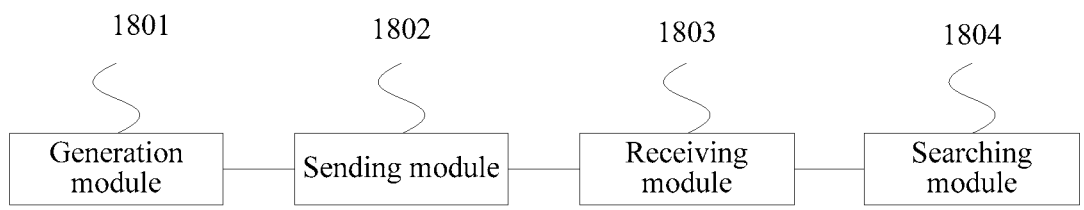
FIG. 18 is a fourth schematic structural diagram of an association establishment apparatus according to an embodiment of the present invention.

FIG. 18 is a fourth schematic structural diagram of an association establishment apparatus according to an embodiment of the present invention. The apparatus is a first station STA, and includes:

a generation module 1801, configured to generate a token identifier, where the token identifier is used to uniquely identify the first STA;

a sending module 1802, configured to send an association request message to an access point AP, where the association request message includes the token identifier generated by the generation module 1801;

a receiving module 1803, configured to receive a multi-block acknowledgement M-BA frame broadcast by the AP, where the M-BA frame includes one or more piece of association acknowledgement information, the association acknowledgement information is acknowledgement information of the association request message, the association acknowledgement information includes a token identifier of one or more second STA and a first association identifier AID that is allocated by the AP to the second STA, and the second STA is a STA corresponding to the association request message successfully received by the AP; and a searching module 1804, configured to: if the searching module 1804 finds that the token identifier of the searching module 1804 is in the M-BA frame, obtain a first AID in association acknowledgement information including the token identifier of the searching module 1804, where the receiving module 1803 is further configured to receive an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

The association establishment apparatus provided in this embodiment can be configured to perform the method steps in the embodiment shown in FIG. 14. Their implementation principles and technical effects are similar, and details are not described herein again.

Further, the association request message further includes a Media Access Control MAC address of the first STA. The association acknowledgement information further includes a MAC address of the second STA.

In an optional manner, a special traffic identifier TID or all 4 bits of a TID in the association acknowledgement information indicates or indicate a quantity of second STAs to which the AP sends acknowledgement requests by using a same piece of association acknowledgement information.

In another optional manner, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information.

Figure 19:
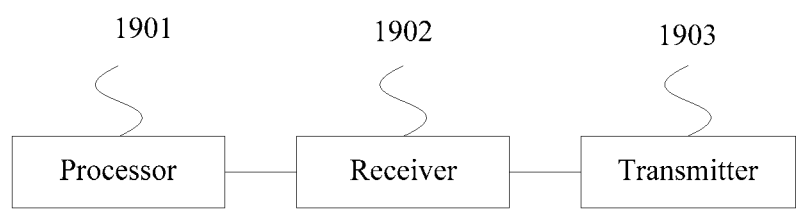
FIG. 19 is a fifth schematic structural diagram of an association establishment apparatus according to an embodiment of the present invention.

FIG. 19 is a fifth schematic structural diagram of an association establishment apparatus according to an embodiment of the present invention. The apparatus is an access point AP, and includes:

a processor 1901, configured to broadcast a trigger frame, where the trigger frame is used to indicate one or more available subchannel and trigger multiple first stations STAs to perform uplink data transmission at the same time;

a receiver 1902, configured to receive an association request message sent on a corresponding available subchannel by each of the multiple first STAs, where the association request message includes a Media Access Control MAC address of the first STA, where the processor 1901 is further configured to broadcast a multi-block acknowledgement M-BA frame, where the M-BA frame includes one or more piece of association acknowledgement information, and the association acknowledgement information is acknowledgement information of the association request message, where if the trigger frame includes a temporary identifier that is allocated by the AP to each available subchannel, the association acknowledgement information includes a MAC address of one or more second STA, so that each second STA determines that the association acknowledgement information is acknowledgement information sent by the AP to the second STA and uses a temporary identifier of a corresponding available subchannel as a first AID of the second STA, where the second STA is a first STA corresponding to the association request message successfully received by the AP; otherwise, the association acknowledgement information includes a MAC address of one or more second STA and a first AID that is allocated by the AP to the second STA; and a transmitter 1903, configured to send an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

The association establishment apparatus provided in this embodiment can be configured to perform the method steps in the embodiment shown in FIG. 2. Their implementation principles and technical effects are similar, and details are not described herein again.

Further, if the trigger frame includes the temporary identifier that is allocated by the AP to each available subchannel, the association acknowledgement information further includes the temporary identifier of the available subchannel corresponding to the second STA.

In an optional manner, the temporary identifier included in the association acknowledgement information is further used to indicate that the association acknowledgement information is the acknowledgement information of the association request message.

In another optional manner, the association acknowledgement information further includes a dummy association identifier, and the dummy association identifier is used to indicate that the association acknowledgement information is the acknowledgement information of the association request message.

In still another optional manner, a special traffic identifier TID in the association acknowledgement information is further used to indicate that the association acknowledgement information is the acknowledgement information of the association request message.

In still another optional manner, 1 bit in a traffic identifier TID in the association acknowledgement information is further used to indicate that the association acknowledgement information is the acknowledgement information of the association request message.

Still further, a special traffic identifier TID or all 4 bits of a TID in the association acknowledgement information indicates or indicate a quantity of second STAs to which the AP sends acknowledgement requests by using a same piece of association acknowledgement information.

Alternatively, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information, or the statistical identifier occupies a bit reserved in block acknowledgement starting sequence control in the association acknowledgement information.

Figure 20:
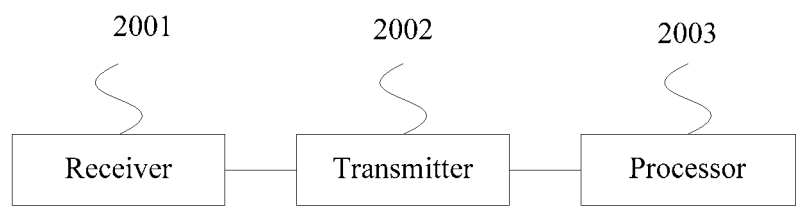
FIG. 20 is a sixth schematic structural diagram of an association establishment apparatus according to an embodiment of the present invention.

FIG. 20 is a sixth schematic structural diagram of an association establishment apparatus according to an embodiment of the present invention. The apparatus is a first station STA, and includes:

a receiver 2001, configured to receive a trigger frame broadcast by an access point AP, where the trigger frame is used to indicate one or more available subchannel and trigger multiple first stations STAs to perform uplink data transmission at the same time; and a transmitter 2002, configured to send an association request message on a corresponding available subchannel, where the association request message includes a Media Access Control MAC address of the first STA, where the receiver 2001 is further configured to receive a multi-block acknowledgement M-BA frame broadcast by the AP, where the M-BA frame includes one or more piece of association acknowledgement information, and the association acknowledgement information is acknowledgement information of the association request message;

the apparatus further includes a processor 2003, where if the trigger frame includes a temporary identifier that is allocated by the AP to each available subchannel, the M-BA frame includes a MAC address of one or more second STA; and if the processor 2003 finds that the MAC address of the first STA is in the M-BA frame, the processor 2003 determines that the association acknowledgement information is acknowledgement information sent by the AP to the processor 2003 and uses a temporary identifier of a corresponding available subchannel as a first AID of the processor 2003; otherwise, the M-BA frame includes a MAC address of one or more second STA and a first AID that is allocated by the AP to the second STA; if the processor 2003 finds that the MAC address of the first STA is in the M-BA frame, the processor 2003 obtains a first AID corresponding to the MAC address of the first STA, where the second STA is a STA corresponding to the association request message successfully received by the AP;

the receiver 2001 is further configured to receive an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

The association establishment apparatus provided in this embodiment can be configured to perform the method steps in the embodiment shown in FIG. 8. Their implementation principles and technical effects are similar, and details are not described herein again.

Further, if the trigger frame includes the temporary identifier that is allocated by the AP to each available subchannel, the association acknowledgement information further includes the temporary identifier of the available subchannel corresponding to the second STA.

In an optional manner, the temporary identifier included in the association acknowledgement information is further used to indicate that the association acknowledgement information is the acknowledgement information of the association request message.

In another optional manner, the association acknowledgement information further includes a dummy association identifier, and the dummy association identifier is used to indicate that the association acknowledgement information is the acknowledgement information of the association request message.

In still another optional manner, a special traffic identifier TID in the association acknowledgement information is further used to indicate that the association acknowledgement information is the acknowledgement information of the association request message.

In still another optional manner, 1 bit in a traffic identifier TID in the association acknowledgement information is further used to indicate that the association acknowledgement information is the acknowledgement information of the association request message.

Still further, a special traffic identifier TID or all 4 bits of a TID in the association acknowledgement information indicates or indicate a quantity of second STAs to which the AP sends acknowledgement requests by using a same piece of association acknowledgement information. The association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information.

Figure 21:
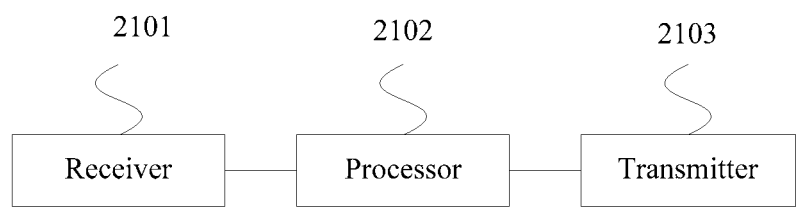
FIG. 21 is a seventh schematic structural diagram of an association establishment apparatus according to an embodiment of the present invention.

FIG. 21 is a seventh schematic structural diagram of an association establishment apparatus according to an embodiment of the present invention. The apparatus is an access point AP, and includes:

a receiver 2101, configured to receive an association request message sent by each of one or more first station STA, where the association request message includes a token identifier generated by the first STA, and the token identifier is used to uniquely identify the first STA;

a processor 2102, configured to broadcast a multi-block acknowledgement M-BA frame, where the M-BA frame includes one or more piece of association acknowledgement information, and the association acknowledgement information is acknowledgement information of the association request message, where the association acknowledgement information includes a token identifier of one or more second STA and a first association identifier AID that is allocated by the AP to the second STA, so that the second STA obtains the first AID according to the token identifier, where the second STA is a first STA corresponding to the association request message successfully received by the AP; and a transmitter 2103, configured to send an association response message to the corresponding second STA according to the first AID, where the association response message is used to indicate that an association between the second STA and the AP is successfully established, the association response message includes a second AID, the second AID is used to identify the second STA, and the second AID is the same as or different from the first AID.

The association establishment apparatus provided in this embodiment can be configured to perform the method steps in the embodiment shown in FIG. 13. Their implementation principles and technical effects are similar, and details are not described herein again.

Further, the association request message further includes a MAC address of the first STA. The association acknowledgement information further includes a MAC address of the second STA.

In an optional manner, a special traffic identifier TID or all 4 bits of a TID in the association acknowledgement information indicates or indicate a quantity of second STAs to which the AP sends acknowledgement requests by using a same piece of association acknowledgement information.

In another optional manner, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information.

Figure 22:
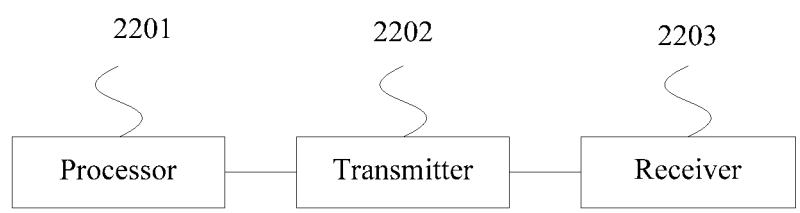
FIG. 22 is an eighth schematic structural diagram of an association establishment apparatus according to an embodiment of the present invention.

FIG. 22 is an eighth schematic structural diagram of an association establishment apparatus according to an embodiment of the present invention. The apparatus is a first station STA, and includes:

a processor 2201, configured to generate a token identifier, where the token identifier is used to uniquely identify the first STA;

a transmitter 2202, configured to send an association request message to an access point AP, where the association request message includes the token identifier generated by the processor 2201; and a receiver 2203, configured to receive a multi-block acknowledgement M-BA frame broadcast by the AP, where the M-BA frame includes one or more piece of association acknowledgement information, the association acknowledgement information is acknowledgement information of the association request message, the association acknowledgement information includes a token identifier of one or more second STA and a first association identifier AID that is allocated by the AP to the second STA, and the second STA is a STA corresponding to the association request message successfully received by the AP, where the processor 2201 is further configured to: if the processor 2201 finds that the token identifier of the processor 2201 is in the M-BA frame, obtain a first AID in association acknowledgement information including the token identifier of the processor 2201; and the receiver 2203 is further configured to receive an association response message that is sent by the AP according to the first AID, where the association response message is used to indicate that an association between the first STA and the AP is successfully established, the association response message includes a second AID, the second AID is used to identify the first STA, and the second AID is the same as or different from the first AID.

The association establishment apparatus provided in this embodiment can be configured to perform the method steps in the embodiment shown in FIG. 14. Their implementation principles and technical effects are similar, and details are not described herein again.

Further, the association request message further includes a Media Access Control MAC address of the first STA. The association acknowledgement information further includes a MAC address of the second STA.

In an optional manner, a special traffic identifier TID or all 4 bits of a TID in the association acknowledgement information indicates or indicate a quantity of second STAs to which the AP sends acknowledgement requests by using a same piece of association acknowledgement information.

In another optional manner, the association acknowledgement information further includes a statistical identifier, and the statistical identifier indicates a quantity of second STAs to which the AP sends acknowledgement requests by using a same piece of association acknowledgement information. The statistical identifier is located after per traffic identifier information in the association acknowledgement information. Alternatively, the statistical identifier occupies a bit reserved in block acknowledgement starting sequence control in the association acknowledgement information.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. An association establishment method carried out on an access point (AP), the method comprising:
   sending a trigger frame, wherein the trigger frame is used to:
      trigger an unassociated station (STA) to perform uplink data transmission, and
      indicate at least one available subchannel for random accessing by the unassociated STA;
   receiving an association request message on an available subchannel, of the at least one available subchannel, acquired by an unassociated STA; and
   sending a multi-user block acknowledgement frame,
   wherein the multi-user block acknowledgement frame includes a piece of association acknowledgement information,
   wherein the piece of association acknowledgement information includes a traffic identifier information field,
   wherein the traffic identifier information field comprises a dummy association identifier, and
   wherein the dummy association identifier indicates the piece of association acknowledgement information is acknowledgement information of the association request message.

2. The method according to claim 1, wherein the dummy association identifier occupies 11 bits.

3. The method according to claim 1, wherein the dummy association identifier is a special association identifier allocated by the AP.

4. The method according to claim 1, wherein the traffic identifier information subfield comprises:
   an acknowledgement (ACK) type, and
   a traffic identifier (TID),
   wherein the traffic identifier information subfield occupies two octets, and
   wherein the ACK type and the TID occupy a total of 5 bits of the traffic identifier information subfield.

5. The method according to claim 1, wherein the association acknowledgement information includes a media access control (MAC) address of the unassociated STA that is acquiring the available subchannel of the at least one available subchannel.

6. The method according to claim 5, wherein the MAC address occupies a total of 6 octets.

7. The method according to claim 1, wherein the trigger frame includes a temporary identifier of the at least one available subchannel allocated by the AP.

8. An association establishment method carried out on a station (STA), the method comprising:
   receiving a trigger frame sent by an access point (AP), wherein the trigger frame is used to:
      trigger an unassociated station (STA) to perform uplink data transmission, and
      indicate at least one available subchannel for random accessing by the unassociated STA;
   performing random accessing to acquire an available subchannel;
   sending an association request message on the available subchannel, of the at least one available subchannel, acquired by an unassociated STA;
   receiving a multi-user block acknowledgement frame,
   wherein the multi-user block acknowledgement frame includes a piece of association acknowledgement information,
   wherein the piece of association acknowledgement information includes a traffic identifier information field,
   wherein the traffic identifier information field comprises a dummy association identifier, and
   wherein the dummy association identifier indicates the piece of association acknowledgement information is acknowledgement information of the association request message.

9. The method according to claim 8, wherein the dummy association identifier occupies 11 bits.

10. The method according to claim 8, wherein the dummy association identifier is a special association identifier allocated by the AP.

11. The method according to claim 8, wherein the traffic identifier information subfield comprises:
   an acknowledgement (ACK) type, and
   a traffic identifier (TID),
   wherein the traffic identifier information subfield occupies two octets, and
   wherein the ACK type and the TID occupy a total of 5 bits of the traffic identifier information subfield.

12. The method according to claim 8, wherein the association acknowledgement information includes a media access control (MAC) address of the unassociated STA that is acquiring the available subchannel of the at least one available subchannel.

13. The method according to anyone of claim 12, wherein the MAC address occupies a total of 6 octets.

14. The method according to claim 8, wherein the trigger frame includes a temporary identifier of the at least one available subchannel allocated by the AP.

15. An association establishment apparatus, comprising:
   a processor; and
   a non-transitory computer-readable medium including computer-executable instructions that, when executed by the processor, cause the association establishment apparatus to carry out an association establishment method comprising:

sending a trigger frame, wherein the trigger frame is used to:
- trigger an unassociated station (STA) to perform uplink data transmission, and
- indicate at least one available subchannel for random accessing by the unassociated STA;

receiving an association request message on an available subchannel, of the at least one available subchannel, acquired by an unassociated STA; and sending a multi-user block acknowledgement frame, wherein the multi-user block acknowledgement frame includes a piece of association acknowledgement information, wherein the piece of association acknowledgement information includes a traffic identifier information field, wherein the traffic identifier information field comprises a dummy association identifier, and wherein the dummy association identifier indicates the piece of association acknowledgement information is acknowledgement information of the association request message.

16. The apparatus according to claim 15, wherein the dummy association identifier occupies 11 bits.

17. The apparatus according to claim 15, wherein the dummy association identifier is a special association identifier allocated by the AP.

18. The apparatus according to claim 15, the traffic identifier information subfield comprises:
- an acknowledgement (ACK) type, and
- a traffic identifier (TID),
- wherein the traffic identifier information subfield occupies two octets, and
- wherein the ACK type and the TID occupy a total of 5 bits of the traffic identifier information subfield.

19. The apparatus according to claim 15, wherein the association acknowledgement information includes a media access control (MAC) address of the unassociated STA that is acquiring the available subchannel of the at least one available subchannel.

20. The apparatus according to anyone of claim 19, wherein the MAC address occupies a total of 6 octets.

21. The apparatus according to claim 15, wherein the trigger frame includes a temporary identifier of the at least one available subchannel allocated by the AP.

22. An association establishment apparatus, comprising:
a processor; and
a non-transitory computer-readable medium including computer-executable instructions that, when executed by the processor, cause the association establishment apparatus to carry out an association establishment method comprising:

receiving a trigger frame sent by an access point (AP), wherein the trigger frame is used to:
- trigger an unassociated station (STA) to perform uplink data transmission, and
- indicate at least one available subchannel for random accessing by the unassociated STA;

performing random accessing to acquire an available subchannel;

sending an association request message on an available subchannel, of the at least one available subchannel, acquired by the association establishment apparatus;

receiving a multi-user block acknowledgement frame, wherein the multi-user block acknowledgement frame includes a piece of association acknowledgement information, wherein the piece of association acknowledgement information includes a traffic identifier information field, wherein the traffic identifier information field comprises a dummy association identifier, and wherein the dummy association identifier indicates the piece of association acknowledgement information is acknowledgement information of the association request message.

23. The apparatus according to claim 22, wherein the dummy association identifier occupies 11 bits.

24. The apparatus according to claim 22, wherein the dummy association identifier is a special association identifier allocated by the AP.

25. The apparatus according to claim 22, the traffic identifier information subfield comprises:
- an acknowledgement (ACK) type, and
- a traffic identifier (TID),
- wherein the traffic identifier information subfield occupies two octets, and
- wherein the ACK type and the TID occupy a total of 5 bits of the traffic identifier information subfield.

26. The apparatus according to claim 22, wherein the association acknowledgement information includes a media access control (MAC) address of the unassociated STA that is acquiring the available subchannel of the at least one available subchannel.

27. The apparatus according to claim 26, wherein the MAC address occupies a total of 6 octets.

28. The apparatus according to claim 22, wherein the trigger frame includes a temporary identifier of the available subchannel allocated by the AP.

* * * * *